(12) United States Patent
Terui et al.

(10) Patent No.: US 6,986,158 B1
(45) Date of Patent: Jan. 10, 2006

(54) SYSTEM AND METHOD FOR DISTRIBUTING VIDEO INFORMATION OVER NETWORK

(75) Inventors: Yuichi Terui, Kawasaki (JP); Tohru Andoh, Kanazawa (JP); Mitsuyo Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/442,885

(22) Filed: Nov. 18, 1999

(30) Foreign Application Priority Data

Mar. 18, 1999 (JP) .................................. 11-073180

(51) Int. Cl.
*H04N 7/173* (2006.01)
*H04N 7/12* (2006.01)
*H04N 11/02* (2006.01)
*H04N 11/04* (2006.01)

(52) U.S. Cl. .................... 725/116; 725/96; 375/240.26; 375/240.27

(58) Field of Classification Search ........... 375/240.12, 375/240.25, 240.26, 240.27; 725/96, 97, 725/105, 107, 115, 116
See application file for complete search history.

(56) References Cited

U.S. PATENT DOCUMENTS

| | | | | |
|---|---|---|---|---|
| 5,805,203 A | * | 9/1998 | Horton | ........................ 725/119 |
| 5,821,986 A | * | 10/1998 | Yuan et al. | ............... 348/14.12 |
| 5,907,660 A | * | 5/1999 | Inoue et al. | ................. 386/109 |
| 5,909,513 A | * | 6/1999 | Liang et al. | ................. 382/253 |
| 5,953,506 A | * | 9/1999 | Kalra et al. | .................. 709/231 |
| 6,014,694 A | * | 1/2000 | Aharoni et al. | ............. 709/219 |
| 6,295,376 B1 | * | 9/2001 | Nakaya | ...................... 382/236 |
| 6,483,878 B1 | * | 11/2002 | Yonezawa et al. | ..... 375/240.25 |

FOREIGN PATENT DOCUMENTS

| | | |
|---|---|---|
| JP | 7-123231 | 5/1995 |
| JP | 8-149453 | 6/1996 |

* cited by examiner

*Primary Examiner*—Christopher Grant
*Assistant Examiner*—Hunter Lonsberry
(74) *Attorney, Agent, or Firm*—Katten Muchin Rosenman LLP

(57) ABSTRACT

A system and method to adaptively control a process of distributing video information over a network. Each client data terminal subscribing to video services has a performance level reporting unit which sends a performance level message Da indicating what resources and computing power the terminal has. Each terminal also has an error status monitor which sends an error status message De. A video coder produces coded data Dc by coding source video signals, based on the received performance level messages Da and error status messages De. The traffic of this coded data Dc is dynamically varied by a dynamic traffic controller, and a distribution unit transmits the resultant video stream Di over the network, using IP multicasting techniques. A video decoder in each client terminal adaptively decodes the received video stream Di.

11 Claims, 25 Drawing Sheets

FIG. 5

| EVENT TYPE | FOLLOW FIRST-ENROLLED CLIENT PC | | |
|---|---|---|---|
| REQUEST FROM CLIENT PC | DESIRED LAN TRAFFIC | | CODING MODE |
| | 384Kbps | | |
| | 256Kbps | | |
| | 192Kbps | | |
| | 128Kbps | | |
| | 76.8Kbps | | |
| | 64Kbps | | |
| | 38.4Kbps | | |
| | 32Kbps | | |
| | 19.2Kbps | | |
| | 4Kbps | | |
| | NONE | | INTERFRAME |
| | INTERFRAME | | |
| TRAFFIC & CODING MODE (Ta) | 384Kbps | | |
| | 256Kbps | | |
| | 192Kbps | | |
| | 128Kbps | | |
| | 76.8Kbps | | |
| | 64Kbps | | |
| | 38.4Kbps | | |
| | 32Kbps | | |
| | 19.2Kbps | | |
| | 4Kbps | | |
| | 384Kbps | | |
| | INTERFRAME | | |
| | INTERFRAME | | |

FIG. 15

| EVENT TYPE | REQUEST FROM CLIENT PC | | TRAFFIC & CODING MODE | | Tb |
|---|---|---|---|---|---|
| FOLLOW HIGHEST-PERFORMANCE CLIENT PC | CPU PERFORMANCE | <133 MHZ | LAN BITRATE | 128Kbps | |
| | | | CODING MODE | INTRAFRAME | |
| | | 133-200 MHZ | LAN BITRATE | 192Kbps | |
| | | | CODING MODE | INTRAFRAME | |
| | | 200-300 MHZ | LAN BITRATE | 256Kbps | |
| | | | CODING MODE | INTRAFRAME | |
| | | ≧300 MHZ | LAN BITRATE | 384Kbps | |
| | | | CODING MODE | INTRAFRAME | |
| FOLLOW MINIMUM-REQUIREMENT CLIENT PC | DESIRED LAN TRAFFIC | 128Kbps | LAN BITRATE | 128Kbps | |
| | | | CODING MODE | INTRAFRAME | |
| | | 76.8Kbps | LAN BITRATE | 76.8Kbps | |
| | | | CODING MODE | INTRAFRAME | |
| | | 64Kbps | LAN BITRATE | 64Kbps | |
| | | | CODING MODE | INTRAFRAME | |
| | | 38.4Kbps | LAN BITRATE | 38.4Kbps | |
| | | | CODING MODE | INTRAFRAME | |
| | | 32Kbps | LAN BITRATE | 32Kbps | |
| | | | CODING MODE | INTRAFRAME | |
| | | 19.2Kbps | LAN BITRATE | 19.2Kbps | |
| | | | CODING MODE | INTRAFRAME | |
| | | 4Kbps | LAN BITRATE | 4Kbps | |
| | | | CODING MODE | INTRAFRAME | |

FIG. 16

| EFFECTIVE TRANSFER RATE | RATIO (DATA FRAMES : FILL-BIT FRAMES) |
|---|---|
| 384Kbps | 1 : 0 |
| 256Kbps | 2 : 1 |
| 192Kbps | 1 : 1 |
| 128Kbps | 1 : 2 |
| 76.8Kbps | 1 : 4 |
| 64Kbps | 1 : 5 |
| 38.4Kbps | 1 : 9 |
| 32Kbps | 1 : 11 |
| 19.2Kbps | 1 : 19 |
| 4Kbps | 1 : 95 |

FIG. 17

SYSTEM AND METHOD FOR DISTRIBUTING VIDEO INFORMATION OVER NETWORK

BACKGROUND OF THE INVENTION

1. Field of the Invention

The present invention relates to a video data distribution system and method, and more particularly to a system and method for distributing video information to a plurality of client data terminals over a network.

2. Description of the Related Art

Remote video monitoring systems have been used to continuously watch one or more objects of interest for certain purposes, e.g., to protect environments or to detect a sign of natural disasters. Typically, dedicated central monitoring facilities equipped with multiple video monitor units are provided to enable centralized monitoring of target objects under observation.

On the other hand, there are such demands that video images of remote objects be accessed through a network from locations other than the dedicated central facilities. This is motivated by the recent advancement of high-performance personal computers (PCs), which has made it possible for general users to enjoy high-speed computing (including video processing) with extremely powerful CPUs and rich memory resources. An increasingly large number of PCs are used today, many of which are linked to each other as Intranet or local area network (LAN) clients. Such a PC network may serve as a suitable infrastructure for sharing remote video information by many users. With appropriate video distribution capabilities implemented on LAN environments, it would be possible for PC users to conveniently make access to remote object images at any time, without using dedicated monitoring facilities.

However, most existing LANs are not suitable for the above-described usage because they are designed basically to transfer computer programs and data files, rather than to convey multimedia traffic which requires much wider bandwidths. In addition, the existing PCs vary greatly in processing power, depending on the date of their deployment.

To deliver video information over a LAN, conventional transmission systems use point to point connections established between a video server and a plurality of client PCs. Intraframe coding algorithms such as Motion JPEG are mainly employed in those conventional systems, along with simple frame subsampling techniques to reduce bitrates. These conventional video transmission techniques, however, have several drawbacks as described below.

First, conventional techniques use connection-oriented communication services, the performance of which depends on total message traffic on the LAN being used. For this reason, only a limited number of client PCs can make simultaneous access to the video source.

Another drawback is that intraframe coding provides too low video compression ratios. In a network environment with a limited transmission bandwidth, insufficient compression would cause unnatural visual effects on the reproduced video, particularly in such a scene that includes rapid motions. Because of this drawback, the conventional systems may not be able to satisfy the user requirements concerning picture quality.

Still another problem with the conventional systems may become apparent in such a situation where both high-performance PCs and low-performance PCs coexist on a single LAN environment. High-performance PCs can decode and display video pictures at a high frame rate, taking advantage of their powerful CPUs, whereas low-performance PCs can only do the same job at limited rates because of their less-capable CPUs. If a high rate video bitstream is broadcast to such non-uniform clients over the network, the low-performance PCs would only be able to reproduce poor video images, or in extreme cases, they would yield nothing. Broadcasting a low rate video bitstream, on the other hand, may not disrupt the decoding operation of low-performance PCs. However, this certainly shuts the high-performance PCs out of the chance to demonstrate their advantages.

In addition to indifference toward the above-described heterogeneity of PC clients in terms of video processing performance, the conventional video broadcasting techniques fail to provide effective measures to deal with transmission errors, which a client PC may encounter during the reception of a coded video stream.

SUMMARY OF THE INVENTION

Taking the above into consideration, an object of the present invention is to provide a system which adaptively controls a process of delivering video information.

To accomplish the above object, according to the present invention, there is provided a system for delivering video information over a network. This system comprises a video data distribution unit and a plurality of data terminals. The video data distribution unit comprises the following elements: a video coder which produces coded data by encoding source video signals based on performance level messages and error status messages; a dynamic traffic controller which dynamically controls traffic of the coded data, thereby producing a video stream for distribution; and a video distribution unit which distributes the produced video stream over the network. On the other hand, each of the data terminals comprises the following elements: a performance level reporting unit which evaluates the performance of the data terminal itself and sends a performance report message to indicate the performance; an error status monitor which monitors error status of the data terminal and sends an error status message to the video data distribution unit when an error is detected; and a video decoder which adaptively decodes the video stream delivered thereto.

Another object of the present invention is to provide a method which adaptively controls a process of delivering video information.

To accomplish this second object, according to the present invention, there is provided a method of delivering video information to a plurality of data terminals over a network. This method comprises the following steps: (a) sending a performance level message from each data terminal to indicate performance of the sending data terminal itself; (b) sending an error status message from each data terminal when the sending data terminal encounters an error; (c) producing coded data by encoding source video signals, based on information contained in the performance level messages and error status messages received from the data terminals; (d) producing a video stream by dynamically controlling traffic of the coded data; (e) distributing the produced video stream to the data terminals over the network; and (f) adaptively decoding the received video stream at the data terminals.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram which shows a coded video stream whose effective data rate is reduced to ¼;

FIGS. 15 and 16 are tables which present two examples of how to assign bitrates and coding mode settings;

FIG. 17 is a table which shows the relationships between effective bitrates and rate multipliers;

DESCRIPTION OF THE PREFERRED EMBODIMENTS

Preferred embodiments of the present invention will be described below with reference to the accompanying drawings.

Figure 1:
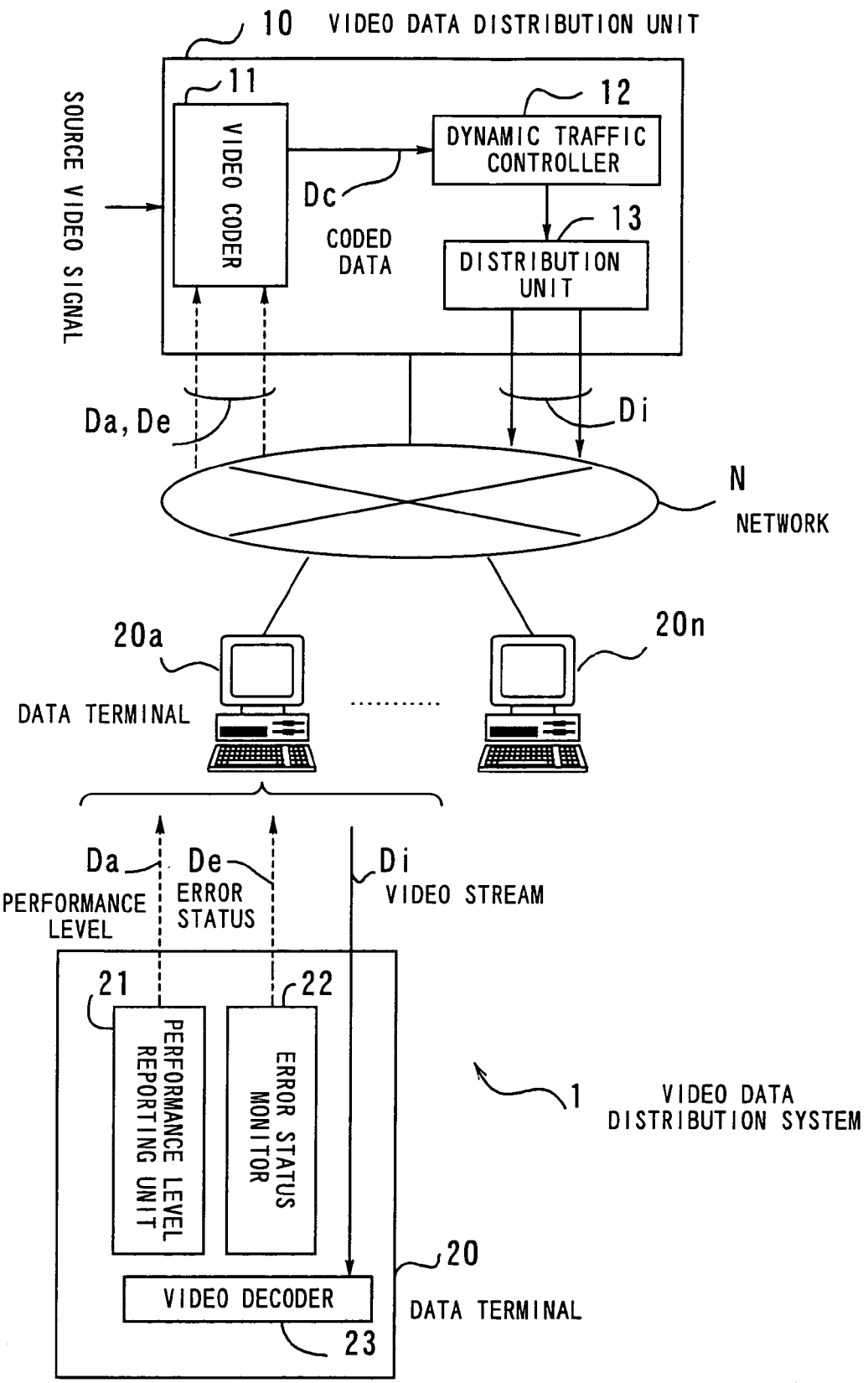
FIG. 1 is a conceptual view of a video data distribution system according to the present invention.

FIG. 1 shows the concept of a video data distribution system according to the present invention. This video data distribution system 1 comprises: a video data distribution unit 10 providing real-time multicast services of digital video data; a plurality of data terminals or personal computers 20a to 20n, and a network N interconnecting them. The system 1 controls delivery of video data over the network N, which is typically a local area network (LAN) or public switched telecommunications network.

The video data distribution unit 10 comprises: a video coder 11, a dynamic traffic controller 12, and a distribution unit 13. The video coder 11 produces coded data Dc by coding given source video signals on the basis of performance level messages Da and error status messages De sent from the data terminals 20a to 20n. The video coder 11 actually uses high compression coding algorithms such as H.261, an ITU-T recommendation for video coding. The dynamic traffic controller 12 dynamically varies the traffic of coded data Dc, as will be described in detail later. The distribution unit 13 distributes the resultant video stream Di over the network N, using IP multicasting techniques.

For simplicity, the plurality of data terminals 20a to 20n are collectively referred to by a simple reference numeral "20" with no suffix. Each data terminal 20 comprises a performance level reporting unit 21, an error status monitor 22, and a video decoder 23. The performance level reporting unit 21 evaluates the performance of the data terminal 20 itself, and produces a performance level message Da for notification. More specifically, this performance level message Da carries system information regarding what resources the data terminal 20 actually has. Optionally, it may include the result report of appropriate benchmark tests.

The error status monitor 22 monitors error status of the data terminal 20. When an error is detected during the reception of a video stream Di, the error status monitor 22 sends an error status message De to the video data distribution unit 10. The video decoder 23 is a software decoder which adaptively reproduce video pictures from the received video stream Di. The decoded video signal is then fed to a monitor of the data terminal 20, allowing the terminal user to view the reproduced video pictures.

Although FIG. 1 does not explicitly shows it, the video data distribution unit 10 further comprises a program data sending unit which provides information on what video program is being distributed or will be distributed. Upon power-up, every data terminal 20 obtains this information from the program data sending unit.

The video coder 11 has two operation modes: interframe coding mode and intraframe coding mode. Normally, the video coder 11 operates in interframe coding mode, in which it extracts and encodes only the difference between frames to provide higher frame refresh rates within a given transmission bandwidth. The video coder 11 switches its operation mode from interframe coding to intraframe coding, when there is a performance level message Da or error status message De that prompts the video coder 11 to do so. Intraframe coding is a coding technique which encodes a picture with no reference to any past or future frames, and the resulting frame is called an "intra-coded frame." On the other hand, the term "intraframe coding mode" is used here to mean such an operation mode where an intra-coded frame is inserted into an interframe-coded video stream at predefined regular intervals.

Coding mode transitions may be initiated by some events, based on a predetermined mode selection strategy. One example of such events is when the performance level messages Da received from the data terminals 20 have revealed that there are less capable terminals whose processor performance is inferior to others. Upon detection of this specific situation, the video coder 11 switches its control to intraframe coding mode and then begins to insert intra-coded frames into its output video stream. While receiving both inter- and intra-coded frames, the video decoders 23 in the less-capable terminals selectively decode the intra-coded frames, thereby yielding a subsampled video stream. This subsampled frame decoding scheme only requires average computing power, allowing less-capable data terminals to reproduce the supplied video stream at a lower frame rate that is suitable for their performance levels. Simultaneously, the other data terminals decode all the frames contained in the received video stream Di because they have sufficient computing power to achieve this. They can display the video at the intended frame rate.

As explained above, the data terminals 20a to 20n on the network N may not necessarily be uniform in performance. The present invention, however, still allows them to decode the same video stream in different ways, taking full advantage of their computing power.

The coding mode also changes when the video data distribution unit 10 is informed of a particular class of errors including those related to the network N or data terminals 20. For instance, launching some additional applications in a data terminal 20 may cause temporary shortage of CPU resources, which sometimes leads to a program execution error. The video coder 11 is designed to change its operation mode from interframe coding mode to intraframe coding mode, if it is informed of intolerably frequent errors regardless of their individual causes.

In a typical implementation, all the data terminals 20 on the network N would migrate to the aforementioned subsampled frame decoding scheme, if the coding mode was changed due to error events. Alternatively, the subsampled frame decoding scheme may be applied only to a specific data terminal that identifies itself as the origin of the errors in question. Suppose, for example, that data reception errors are frequently observed only in the data terminal 20a. The data terminal 20a then changes its decoding mode, while the other terminals continue to decode all the provided frames as usual.

To summarize the above discussion, the proposed video data distribution system 1 is designed to perform video coding based on performance level messages Da and error status messages De received from the data terminals 20a to 20n. The output video stream Di is produced and distributed through a video traffic channel whose bitrate is determined dynamically. The video data distribution system 1 uses connectionless, IP multicasting techniques to distribute video information to multiple destinations, and for this reason, the number of destinations is less likely to be limited by the LAN traffic. While IP multicast services in general do not guarantee the quality of data transport, the video data distribution system 1 of the present invention compensates for this disadvantage by introducing the above-mentioned mechanism of adaptively controlling video data traffic in accordance with the performance levels and error status of individual data terminals 20a to 20n. In addition, the present invention makes it possible for the receiving data terminals 20a to 20n to choose a suitable decoding method, depending on their performance levels. Accordingly, high-performance terminals can reproduce quality pictures, making full use of their capabilities, while less capable terminals are still allowed to decode the same video stream by extracting intra-coded frames.

The next section will present a more specific system in which the video data distribution system 1 is implemented.

Figure 2:
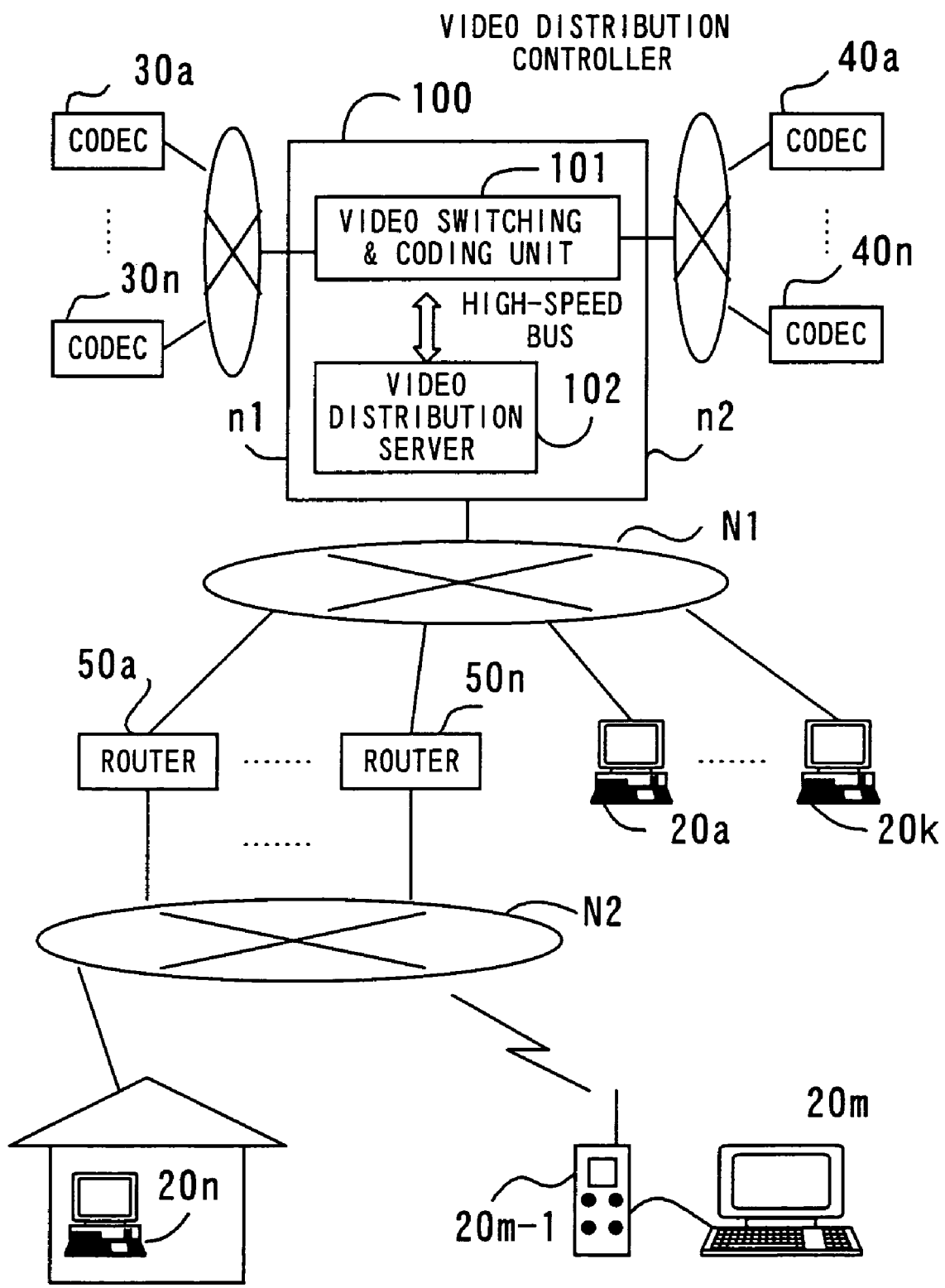
FIG. 2 is a diagram which shows a specific example of the proposed system.

FIG. 2 is a block diagram of the proposed system, which employs a video distribution controller 100 comprising two key components: a video switching & coding unit 101 and a video distribution server 102. These two components are interconnected by a high-speed bus. The video coder 11 and dynamic traffic controller 12 (FIG. 1) are implemented here in the video switching & coding unit 101, while the distribution unit 13 (FIG. 1) in the video distribution server 102. The video switching & coding unit 101 is connected to external codecs (coder/decoder) 30a to 30n (e.g., MPEG2 codecs) via a network n1 (e.g., G.703 network with a bandwidth of 6 Mbps). Alternatively, the codecs 30a to 30n may be linked directly to the video switching & coding unit 101. Although not shown in FIG. 2, it should be appreciated that those codecs 30a to 30n may also be coupled to video cameras directed to the target objects, local monitor units, etc.

The video switching & coding unit 101 is also connected to another network n2 (e.g., I.431 network with a bandwidth of 1.5 Mbps) to communicate with another group of codecs 40a to 40n (e.g., H.320 codecs for videoconferencing) available on it. Alternatively, those codecs 40a to 40n may be linked directly to the video switching & coding unit 101. As with the aforementioned codecs 30a to 30n, the codecs 40a to 40n may also be coupled to video cameras and monitor units, although FIG. 2 does not show them.

The video switching & coding unit 101 performs switching and coding of source video data received through the networks n1 and n2, and passes the resultant video streams to the video distribution server 102 via the high-speed bus. The video distribution server 102 is linked to the routers 50a to 50n and PCs 20a to 20k through a still another network N1, which is typically a local area network (LAN). The routers 50a to 50n used in this system are dialup routers which connect the LAN N1 with a telephone network N2. This telephone network N2 may be an ISDN network or a wireless personal communications network, including cellular and cordless telephone systems, for example. FIG. 2 illustrates a few pieces of subscriber equipment on the network N2, which include a desktop PC 20n with a modem and a cellular handset 20m-1, while not showing, for simplicity, base stations and other equipment necessary for mobile radio communications. The cellular handset 20m-1 serves here as a radio link interface allowing a mobile PC 20m to make access to the network N2.

With the above system configuration, the video switching & coding unit 101 encodes source video signals, and the video distribution server 102 distributes the resultant video streams to their ultimate destinations, i.e., the home PC 20n and mobile PC 20m. It should be noted, however, that a bottleneck can be found somewhere on the network paths from the video switching & coding unit 101 to the client PCs. The routers 50a to 50n, for instance, may be a dominant factor in system performance. If the presence of such a bottleneck is known in advance, the dynamic traffic controller 12 makes a necessary adjustment not to direct too much traffic to that particular path.

As described above, the dynamic traffic controller 12 dynamically changes the video data traffic on each transmission path to distribute video information derived from a single video source. With this dynamic traffic control, the proposed system can distribute each single video stream to remote clients via a plurality of transmission paths having different bandwidths.

Figure 3:
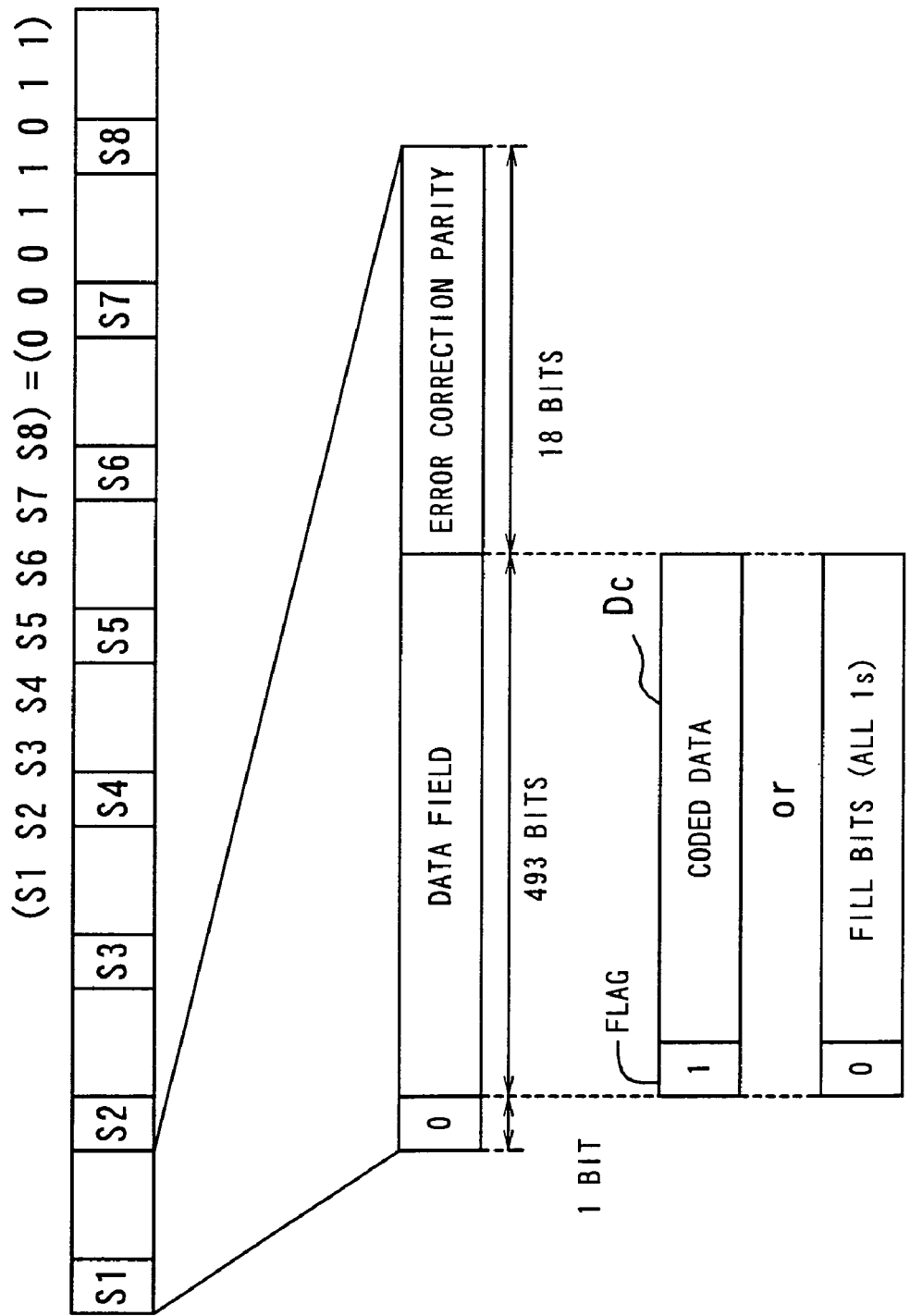
FIG. 3 is a diagram which shows a transmission frame format of a coded video stream.

Referring now to FIG. 3, the next section will describe the transmission data format of coded data Dc, which is supplied from the video coder 11 to the dynamic traffic controller 12 and then to the distribution unit 13. As FIG. 3 shows, eight consecutive transmission data frames form a single unit of video stream, starting with a frame S1 and ending with a frame S8. Note that the labels "S1" to "S8" actually refer to the framing bits, while the same labels are used here to distinguish between individual transmission frames. That is, framing bits S1 to S8 are the first bits of the eight consecutive transmission frames, and the following particular bit pattern of S1 to S8 indicates a valid frame alignment.

(S1 S2 S3 S4 S5 S6 S7 S8)=(0 0 0 1 1 0 1 1)

This alignment pattern allows the recipient (e.g., distribution unit 13) to recognize each frame boundary and thus synchronize itself with the flow of transmission frame signals.

Each transmission frame consists of the following fields: a single framing bit Sn (n=1, 2, . . . 8) for frame synchronization; a 493-bit data field, including a single flag bit; and a 18-bit error correction parity information field. The first bit of the data field is allocated to a flag that indicates whether the data field contains true coded data or fill-bit stuffing. More specifically, when the flag is set to one, the remaining 492-bit data field contains a part of the coded data Dc. When the flag is set to zero, the remaining data bits are filled with ones, hence "fill bits." The recipients use the 18-bit error correction parity information to make sure the validity of the received bitstream, as well as correct errors if detected.

Figure 4:
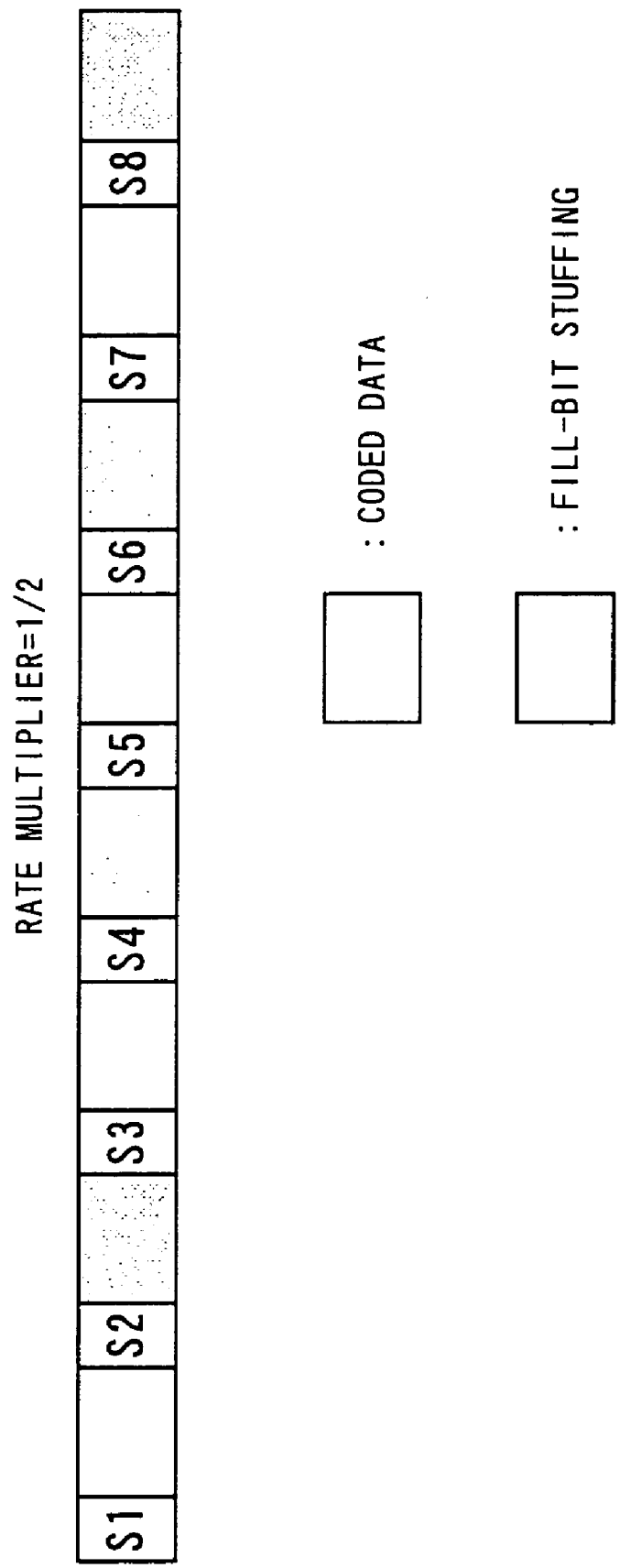
FIG. 4 is a diagram which shows a coded video stream whose effective data rate is reduced to ½.
Figure 6:
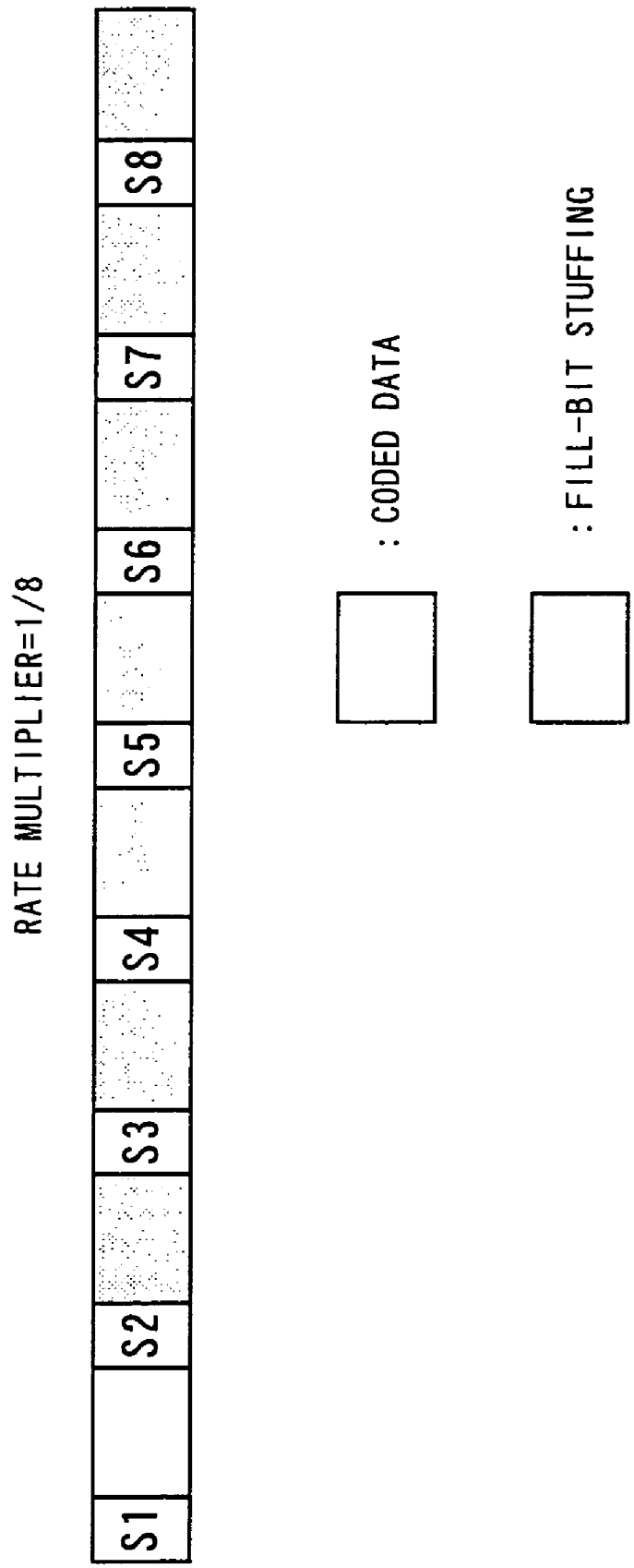
FIG. 6 is a diagram which shows a coded video stream whose effective data rate is reduced to ⅛.

Referring now to FIGS. 4 to 6, the next section will describe dynamic traffic control functions provided by the dynamic traffic controller 12. The dynamic traffic controller 12 determines a rate multiplier for varying the effective transfer rate of coded data Dc to dynamically control the video data traffic which will spend some network bandwidth. FIGS. 4 to 6 present several different patterns of coded data Dc processed by the dynamic traffic controller 12 with successively smaller rate multipliers. More specifically, FIG. 4 shows a case where the rate multiplier is set to ½; FIG. 5 shows a case where the rate multiplier is set to ¼; FIG. 6 shows a case where the rate multiplier is set to ⅛.

Referring first to FIG. 4, the dynamic traffic controller 12 uses four transmission frames S1, S3, S5, and S7 to convey the coded data Dc, while stuffing fill bits into the other four transmission frames S2, S4, S6, and S8. This interleaved pattern reduces the effective transfer rate to one half the original rate.

Referring next to FIG. 5, the dynamic traffic controller 12 uses only two transmission frames S1 and S5 to convey the coded data Dc, while stuffing fill bits into the other six transmission frames S2, S3, S4, S6, S7, and S8. This reduces the effective transfer rate to one quarter the original rate.

Referring now to FIG. 6, the dynamic traffic controller 12 uses only the first transmission frame S1 to carry the coded data Dc, while stuffing fill bits into all the remaining transmission frames S2, S3, S4, S5, S6, S7, and S8. This reduces the effective transfer rate to one eighth the original rate.

In the way described above, the dynamic traffic controller 12 varies the effective transfer rate of coded data Dc to dynamically control the video data traffic. With this capability, the proposed system efficiently manages the usage of available network bandwidth. There are several possible factors that may affect the rate multiplier. They are: supervisory events sent from the supervisor's console, network events sent from network monitoring facilities, and client events sent from data terminals. The rate multiplier is derived from one or more of those external events as will be described later.

Figure 7:
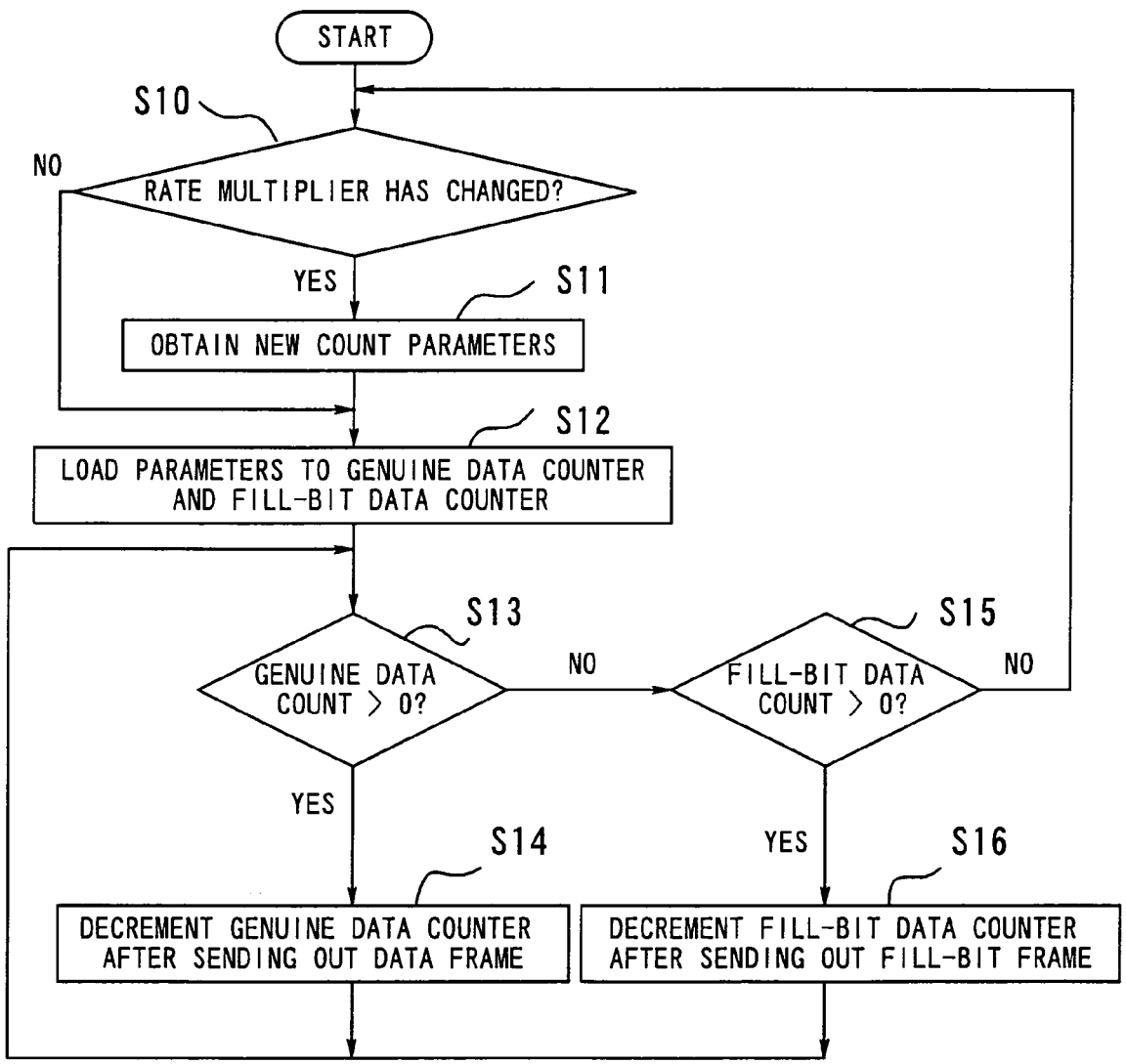
FIG. 7 is a flowchart which shows a process executed by a dynamic traffic controller to vary the data transfer rate of a coded video stream.

FIG. 7 is a flowchart showing a process to change the effective transfer rate of coded data Dc. This process is executed by the dynamic traffic controller 12 according to the following steps.

(S10) The dynamic traffic controller 12 checks whether the rate multiplier has been changed. If a new rate multiplier is given, the process advances to step S11. Otherwise, the process proceeds to step S12.

(S11) The dynamic traffic controller 12 obtains two count parameters corresponding to the new rate multiplier value. These parameters are integers to be preset to two down counters called a "genuine data counter" and a "fill-bit data counter."

(S12) The dynamic traffic controller 12 loads the counter preset values to the genuine data counter and fill-bit data counter.

(S13) If the genuine data counter value is still greater than zero, the process advances to step S14. If it has reached zero, the process proceeds to step S15.

(S14) When a transmission frame containing coded data Dc is sent out to the distribution unit 13, the dynamic traffic controller 12 decrements the genuine data counter by one. The process then returns to step S13.

(S15) If the fill-bit data count value is still greater than zero, the process advances to step S16. If it has reached zero, the process returns to step S10.

(S16) When a transmission frame containing fill bits is sent out to the distribution unit 13, the dynamic traffic controller 12 decrements the fill-bit data counter by one. The process then returns to step S13.

Repeating the above-described steps, the dynamic traffic controller 12 produces a series of transmission frames, in which the coded data Dc is interleaved with as many fill-bit frames as specified by a given rate multiplier. The produced signal is then supplied to the distribution unit 13.

Figure 8:
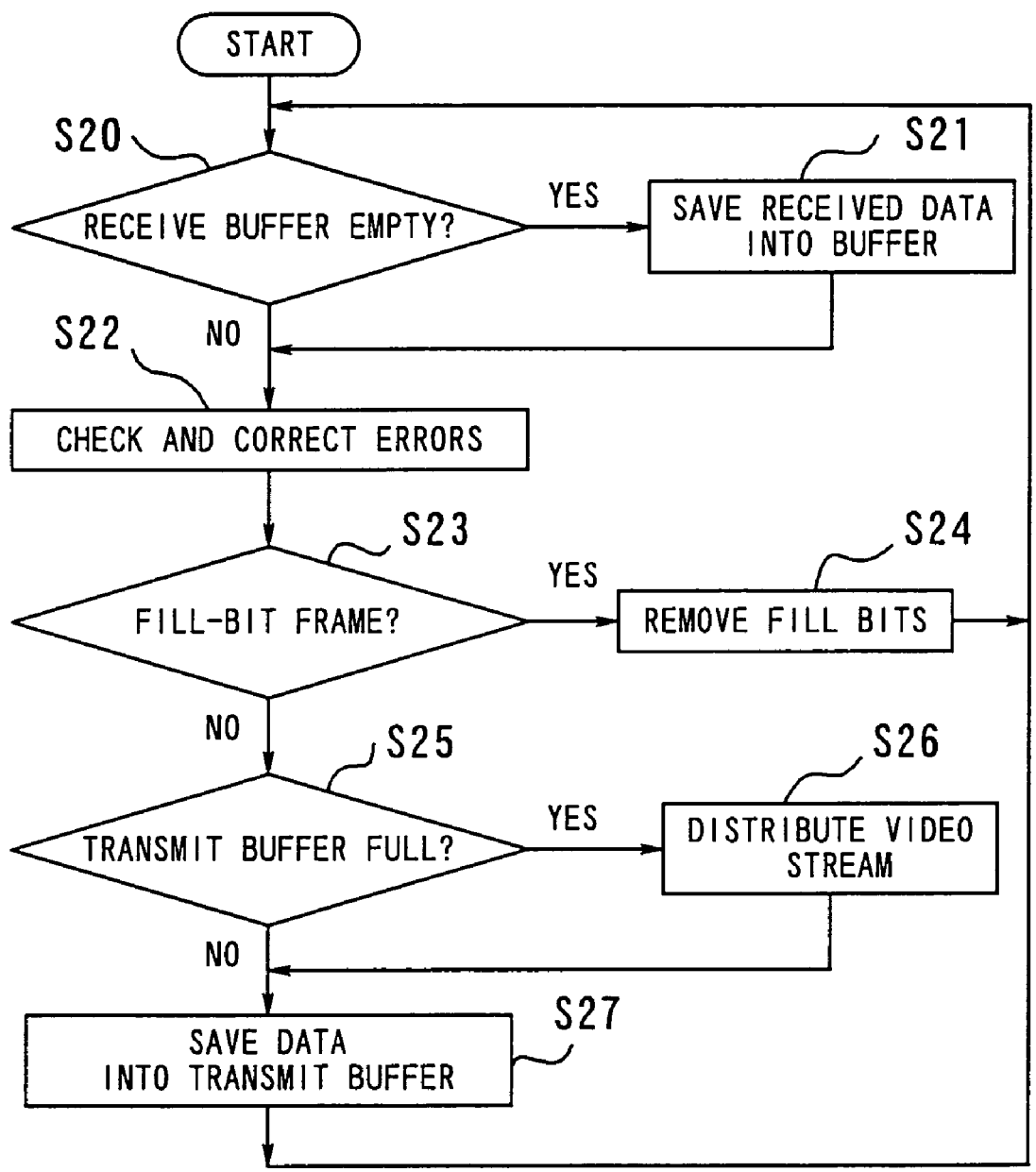
FIG. 8 is a flowchart which shows a process of removing fill bits and delivering the resultant video stream.

Referring now to FIG. 8, the operation of the distribution unit 13 will be described below. In short, the distribution unit 13 removes fill bits from the received video stream and distributes the resultant video stream Di over the network. FIG. 8 is a flowchart showing this video distribution process, which comprises the following steps.

(S20) If the receive buffer in the distribution unit 13 indicates an empty status, the process advances to step S21. Otherwise, the process proceeds to step S22.

(S21) The distribution unit 13 waits for video signals to come from the dynamic traffic controller 12, and saves each received transmission frame into its receive buffer.

(S22) The distribution unit 13 performs error detection and correction, based on the error correction parity information attached to the received data.

(S23) If the received transmission frame is a fill-bit frame, the process advances to step S24. If not, the process proceeds to step S25.

(S24) The distribution unit 13 removes fill bits from the received data. The process then returns to step S20.

(S25) If the transmit buffer in the distribution unit 13 indicates a full status, the process advances to step S26. Otherwise, the process proceeds to step S27.

(S26) Reading out the stored data from the transmit buffer, the distribution unit 13 transmits the video stream Di toward the data terminals 20a to 20n.

(S27) The distribution unit 13 saves the produced video stream Di into the transmit buffer for later transmission. The process then returns to step S20.

As described in FIGS. 7 and 8, the dynamic traffic controller 12 is designed to insert fill-bit frames into coded data Dc to vary its effective transfer rate, and the distribution unit 13 is configured to remove the fill-bit frames and distribute the resultant video stream Di. This arrangement adaptively controls video data traffic, making it possible to deliver video services more efficiently.

Figure 9:
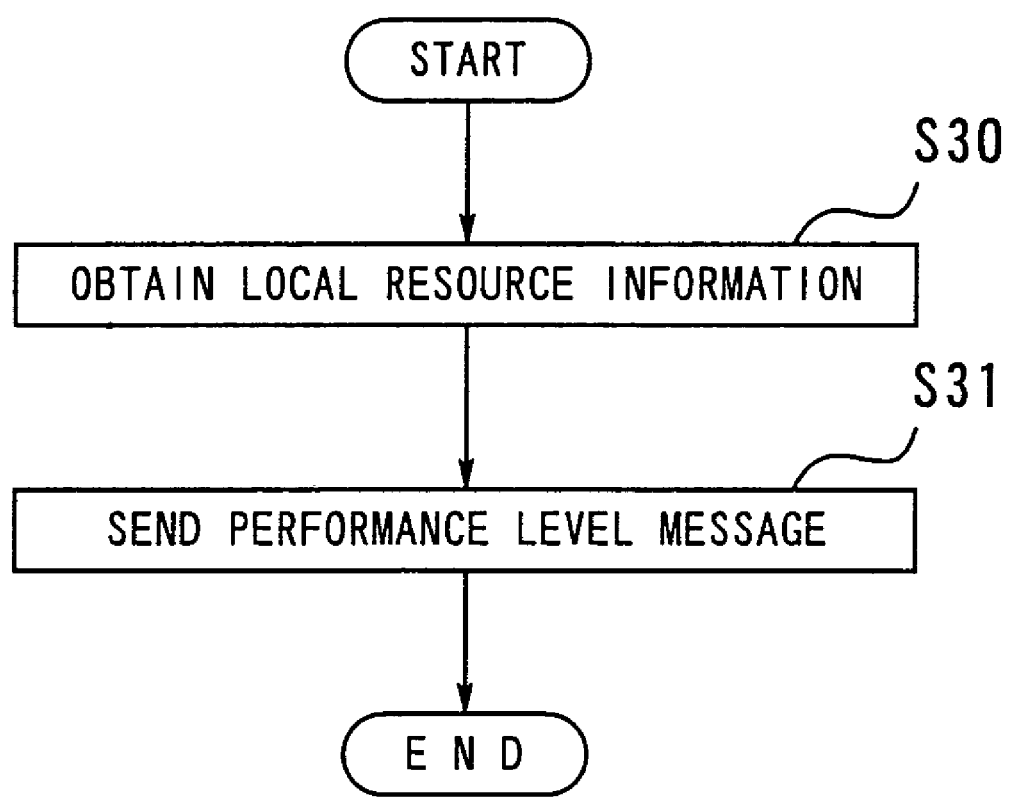
FIG. 9 is a flowchart which shows a process executed by a performance level reporting unit in a data terminal to report what resources the terminal has.
Figure 10:
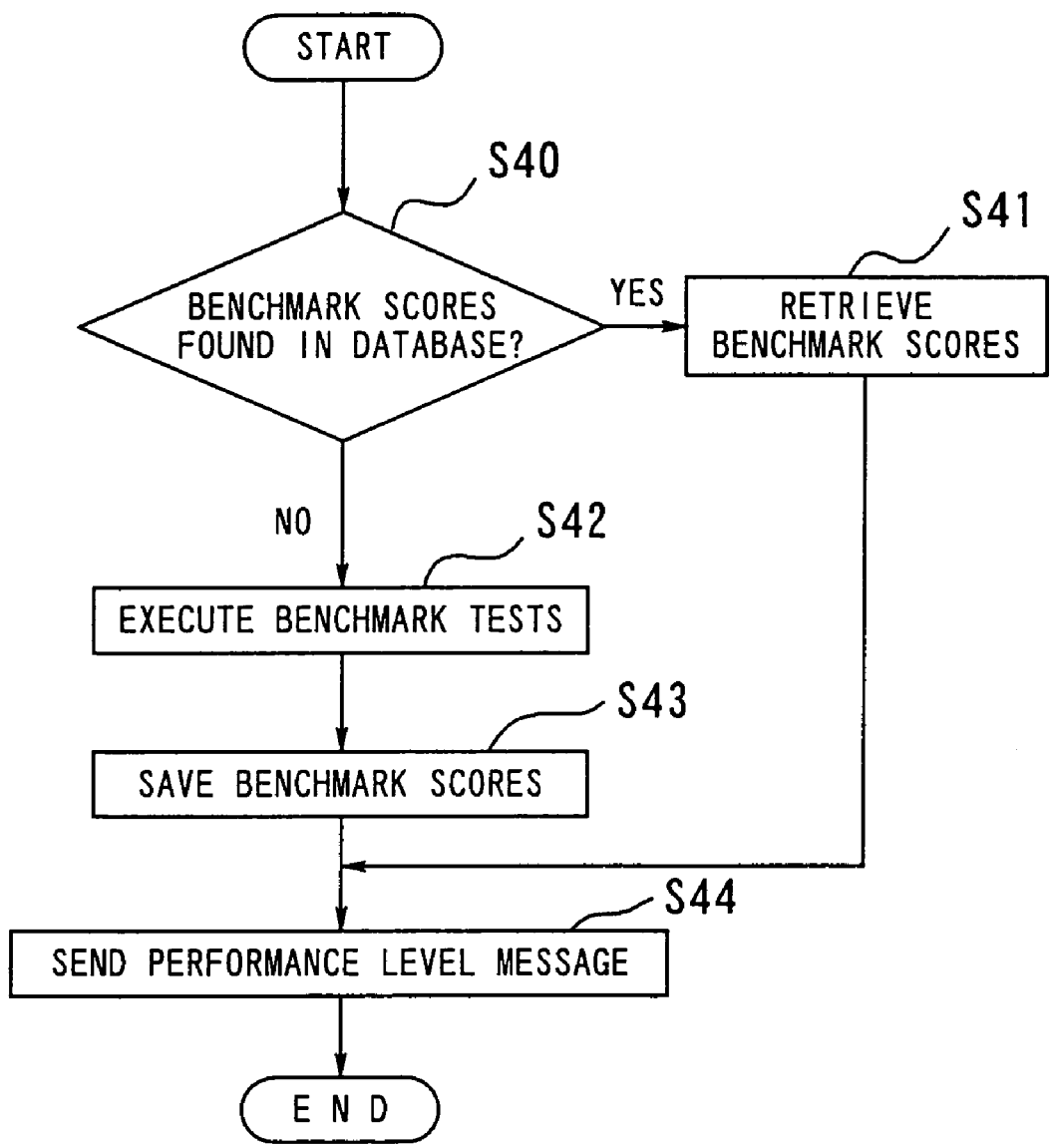
FIG. 10 is a flowchart which shows a process executed by the performance level reporting unit to report benchmark scores.

Referring next to FIGS. 9 and 10, the following section will describe the performance level reporting unit 21 implemented in each data terminal 20.

The performance level reporting unit 21 is responsible for reporting what computing resources the data terminal 20 owns and/or how high benchmark scores it achieves with them. This information is to be sent to the video data distribution unit 10 in the form of performance level messages Da. Appropriate benchmark tests indicate the total performance of the data terminal 20, reflecting the ability of individual, and combinations of, computing resources. FIG. 9 is a flowchart which explains a process to report what computing resources the data terminal 20 has. The performance level reporting unit 21 executes this process according to the following steps.

(S30) The performance level reporting unit 21 makes access to a local database, or calls an appropriate function of the application programming interface (API), to know what computing resources the data terminal 20 actually has. The local resource information obtained at this step may include CPU type, operating clock frequency, memory size, and other major component specifications.

(S31) The performance level reporting unit 21 sends to the video data distribution unit 10 a performance level message Da containing the resource information obtained at step S30.

FIG. 10 is a flowchart which shows a process to report benchmark scores. The performance level reporting unit 21 executes this process according to the following steps.

(S40) The process advances to step S41 if benchmark scores are found in the database, and if they are appropriate for performance level messages Da. Otherwise, the process proceeds to step S42.

(S41) The performance level reporting unit 21 retrieves the benchmark scores from the database. The process then skips to step S44.

(S42) The performance level reporting unit 21 initiates a predetermined set of benchmark tests. The tests include, for example, such a program that replays locally a fixed-length video clip file stored in a hard disk. The execution time is measured and saved as a benchmark score.

(S43) The test results are entered to the database.

(S44) The performance level reporting unit 21 sends to the video data distribution unit 10 a performance level message Da containing the benchmark scores.

Figure 11:
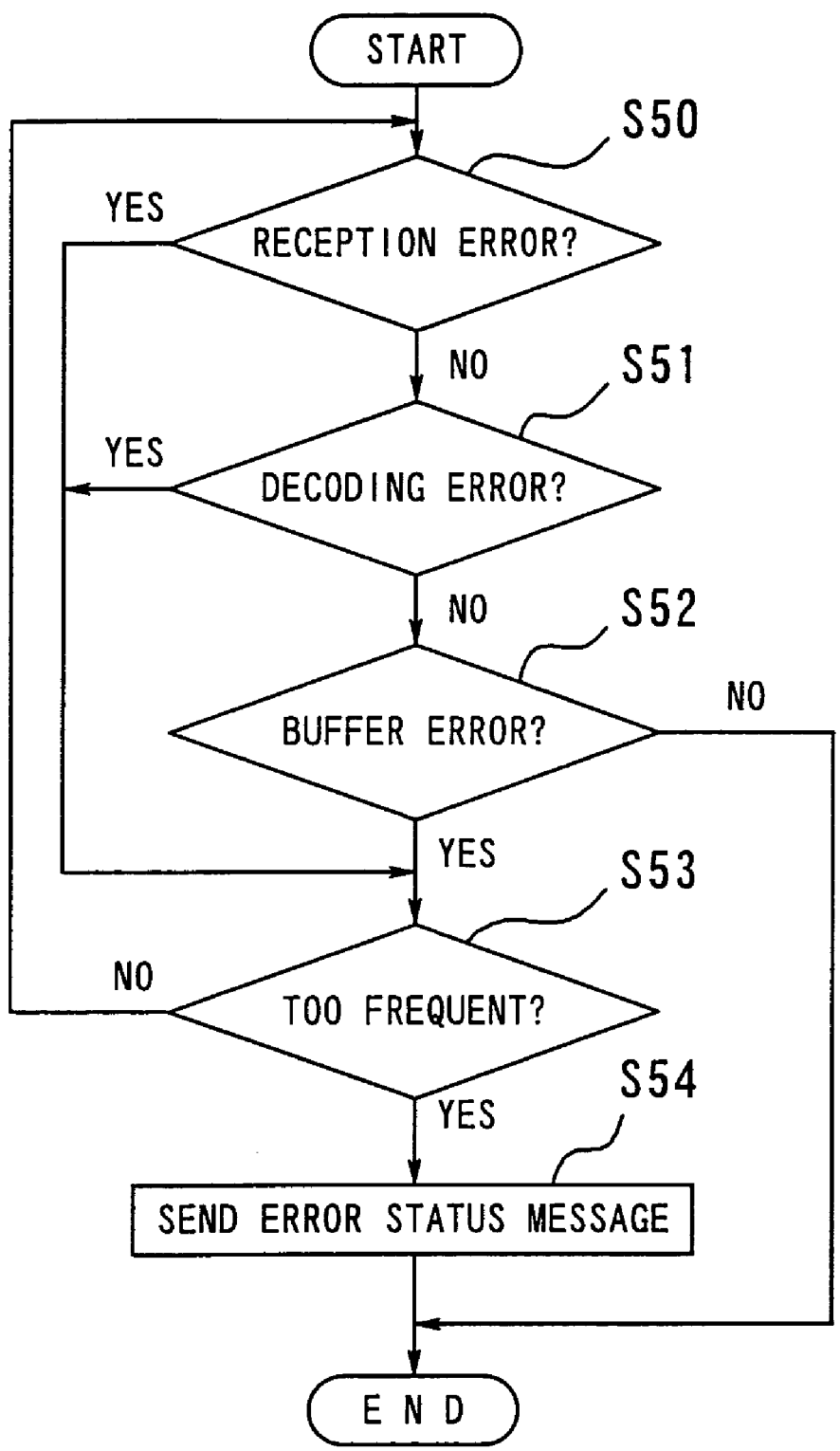
FIG. 11 is a flowchart which shows a process executed by an error status monitor to report what error is detected.

The next section will describe the error status monitor 22 implemented in each data terminal 20. FIG. 11 is a flowchart which shows a process to send error status information. The error status monitor 22 executes this process according to the following steps.

(S50) The error status monitor 22 checks whether any errors are detected with regard to data reception. If any such errors are found, the process skips to step S53. Otherwise, the process advances to step S51.

(S51) The error status monitor 22 then checks whether any errors are detected with regard to video decoding operations. If any such errors are found, the process skips to step S53. Otherwise, the process goes to step S52.

(S52) The error status monitor 22 then checks whether any errors are detected with regard to data buffer operations. If any such errors are found, the process advances to step S53. Otherwise, the error status monitor 22 exits from this process, allowing the video decoder 23 to continue its decoding operation.

(S53) The error status monitor 22 evaluates the frequency of errors. If the error frequency exceeds a predetermined tolerance level, the process advances to step S54. If it is within an acceptable range, the process returns to step S50.

(S54) The error status monitor 22 sends an error status message De to the video data distribution unit 10. In this problem situation, the video decoder 23 changes its decoding operation from normal mode to subsampled mode.

In the above process, the error status monitor 22 sends an error status message De when it encounters intolerably frequent errors. Alternatively, it can be configured to send an error status message De every time it finds an error. In this case, the video data distribution unit 10 would count errors and determine whether to take action or just wait and see the situation.

Figure 12:
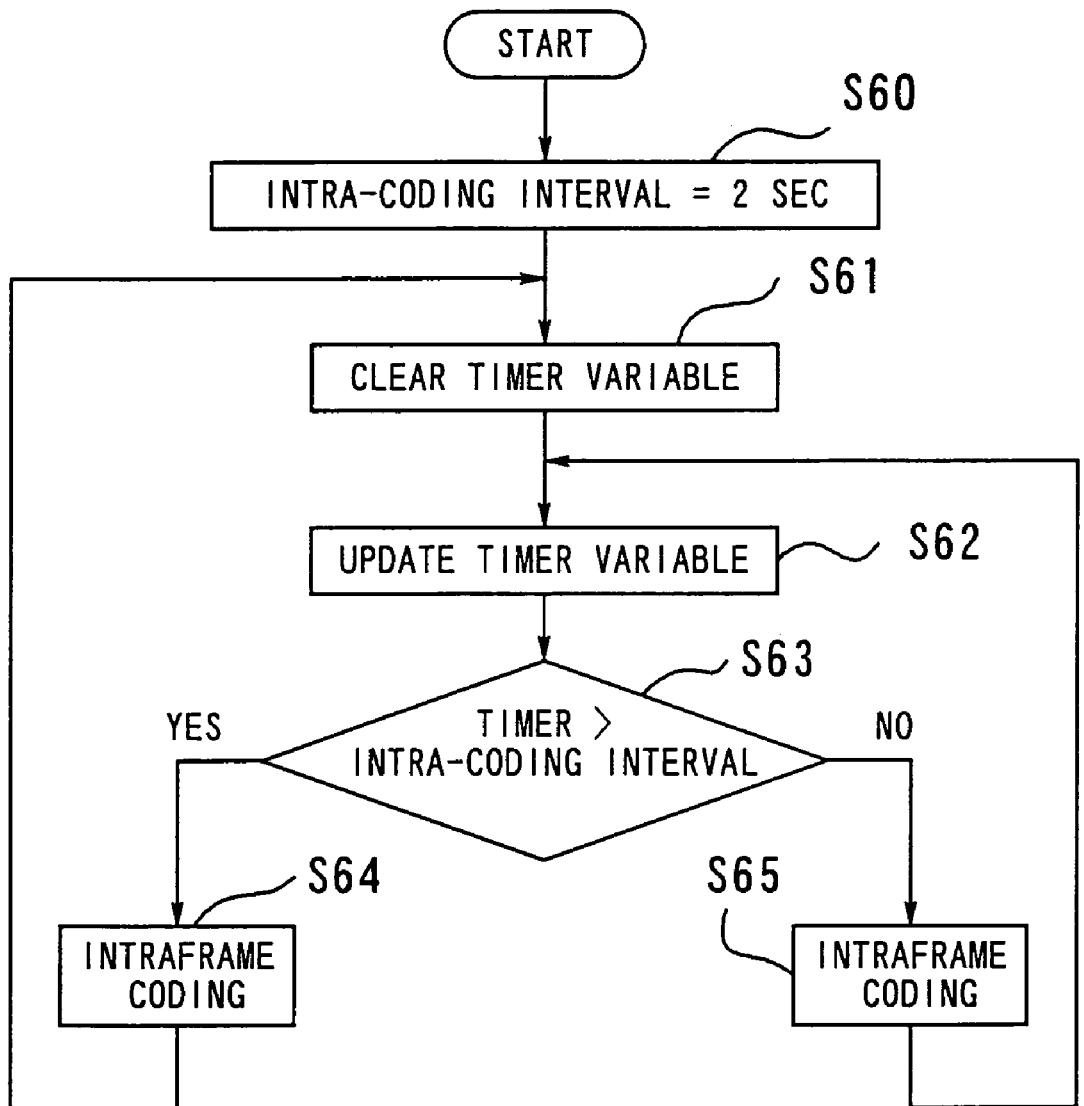
FIG. 12 is a flowchart which shows a video coding process programmed to insert intra-coded frame at intervals of two seconds.

The next section will provide explanation of a video coding process. FIG. 12 is a flowchart which shows a video coding process programmed to insert an intra-coded frame every two seconds. The video coder 11 executes this process according to the following steps.

(S60) The video coder 11 has a parameter called an intra-coding interval, which gives the interval of intra-coded frames to be inserted into an interframe coded video stream. In the present example, this intra-coding interval is set to two seconds.

(S61) The video coder 11 initializes a timer variable to zero.

(S62) The video coder 11 updates the timer variable so as to represent the elapsed time since the last insertion of an intra-coded frame.

(S63) If the timer variable shows that the intra-coding interval is reached, the process advances to step S64. Otherwise, the process proceeds to step S65.

(S64) The video coder 11 produces an intra-coded frame and then returns to step S61.

(S65) The video coder 11 performs interframe coding and then returns to step S62.

Figure 13:
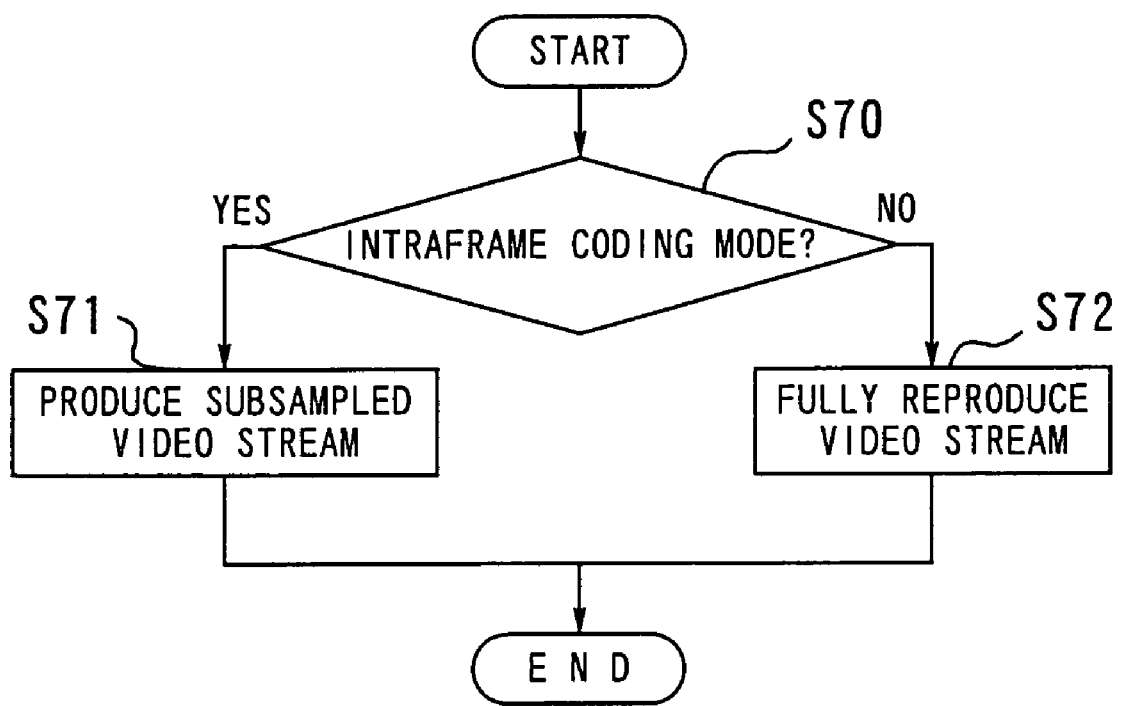
FIG. 13 is a flowchart which shows a video decoding process.

The next section will describe the operation of the video decoder 23 implemented in each data terminal 20. FIG. 13 is a flowchart showing a video decoding process, which comprises the following steps.

(S70) If the current coding mode is intraframe coding mode, the process advances to step S71. Otherwise, the process proceeds to step S72.

(S71) The video decoder 23 selectively decodes the intra-coded frames, thereby yielding a subsampled video stream from the received video streams.

(S72) The video decoder 23 decodes all incoming coded data, fully reproducing the video stream.

Figure 14:
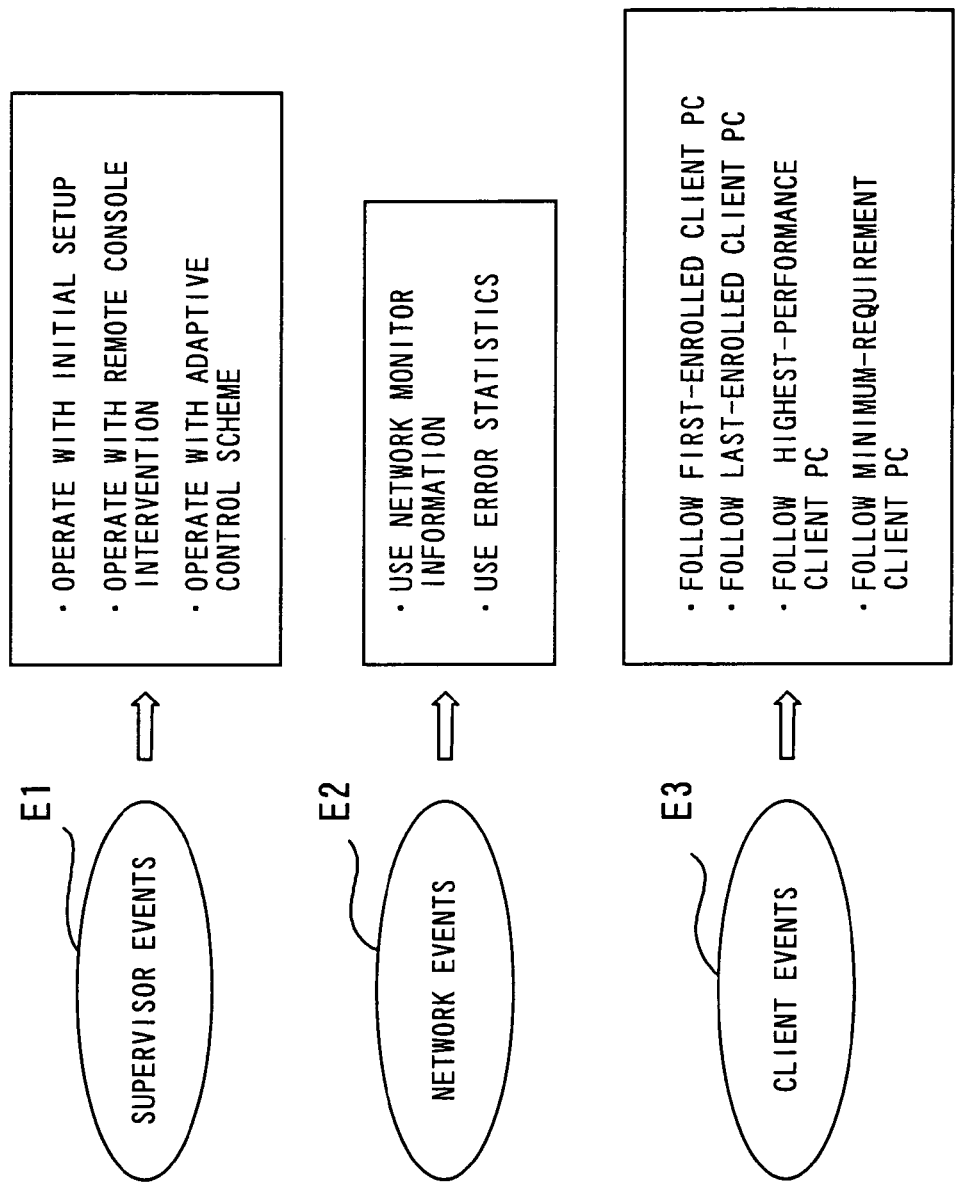
FIG. 14 is a diagram which shows different event groups.

The next section will describe the details of events which may affect the decision of rate multiplier values in dynamic traffic control. FIG. 14 shows that events are categorized into the following three groups: supervisor events E1, network events E2, and client events E3. The following provides more about these event classes.

Supervisor events E1 occur when a specific request is received from the supervisor's remote console (not shown), which is coupled to the video data distribution unit 10. This event group specifies how to operate the video data distribution unit 10, such as "Operate with initial setup," "Operate with remote console intervention," "Operate with adaptive control scheme." The first event "Operate with initial setup" directs the video data distribution unit 10 to control video data traffic in a fixed manner, on the basis of an initially given bitrate (e.g., 10 Mbps). The second event "Operate with remote console intervention" requests the video data distribution unit 10 to vary video data traffic according to instructions from the remote console. The third event "Operate with adaptive control scheme" permits the dynamic traffic controller 12 to autonomously determines the rate multiplier to control video data traffic.

Network events E2 direct the video data distribution unit 10 to control traffic such that the current status of the network N (FIG. 1) be reflected. This event group includes "Use network monitor information" and "Use error statistics," for example. The first event "Use network monitor information" requests the video data distribution unit 10 to use the information about the network N provided from a network monitor, if available. The second event "Use error statistics" requests the video data distribution unit 10 to operate on the basis of statistical analysis on error instances, or error status messages De.

Client events E3 are related to the policy of handling requests from client PCs, or data terminals 20. This class of events include: "Follow first-enrolled client PC," "Follow last-enrolled client PC," "Follow highest-performance client PC," and "Follow minimum-requirement client PC." The first event "Follow first-enrolled client PC" directs the dynamic traffic controller 12 to control in accordance with the performance of a specific client PC that has enrolled earlier than any other clients. Likewise, the second event "Follow last-enrolled client PC" directs the dynamic traffic controller 12 to follow the performance of the last-enrolled client PC. The third event "Follow highest-performance client PC" directs the dynamic traffic controller 12 to follow a specific client PC that has the powerful CPU. The fourth event "Follow minimum-requirement client PC" requests the dynamic traffic controller 12 to set the video data traffic according to the lowest bitrate among those specified by client PCs. It should be noted here that the above events also affect the coding mode selection strategies.

FIGS. 15 and 16 show some examples of how the above events are associated with the video bitrate and coding mode. Table Ta shown in FIG. 15 is used when the video data distribution unit 10 is directed to follow the first-enrolled client PC. If that client PC specifies LAN traffic of 384 kbps and interframe coding mode, the video data distribution unit 10 will configure itself to produce a video stream of 384 kbps in interframe coding mode. On the other hand, another table Tb of FIG. 16 is used when the video data distribution unit 10 is directed to follow the highest-performance client PC. If one client PC has a CPU operating at 133 MHz to 200 MHz, the video data distribution unit 10 will configure itself to produce a video stream of 192 kbps in intraframe coding mode.

FIG. 17 shows a table Tc which provides the relationship between effective bitrates and fill-bit stuffing ratios. The fill-bit stuffing ratio denotes a ratio between genuine data frames and fill-bit frames mixed in a series of video transmission frames. As described earlier in FIGS. 3 to 6, the effective bitrate of video signals is reduced by inserting fill-bit frames at an appropriate ratio, i.e., fill-bit stuffing ratio. Table Tc of FIG. 17 gives such ratios corresponding to various effective bitrates. Suppose, for instance, that an effective bitrate of 128 kbps is desired. According to the table Tc, this bitrate is achieved by setting the fill-bit stuffing ratio to 1:2, meaning that two fill-bit frames should be inserted after every single genuine data frame.

Figure 18:
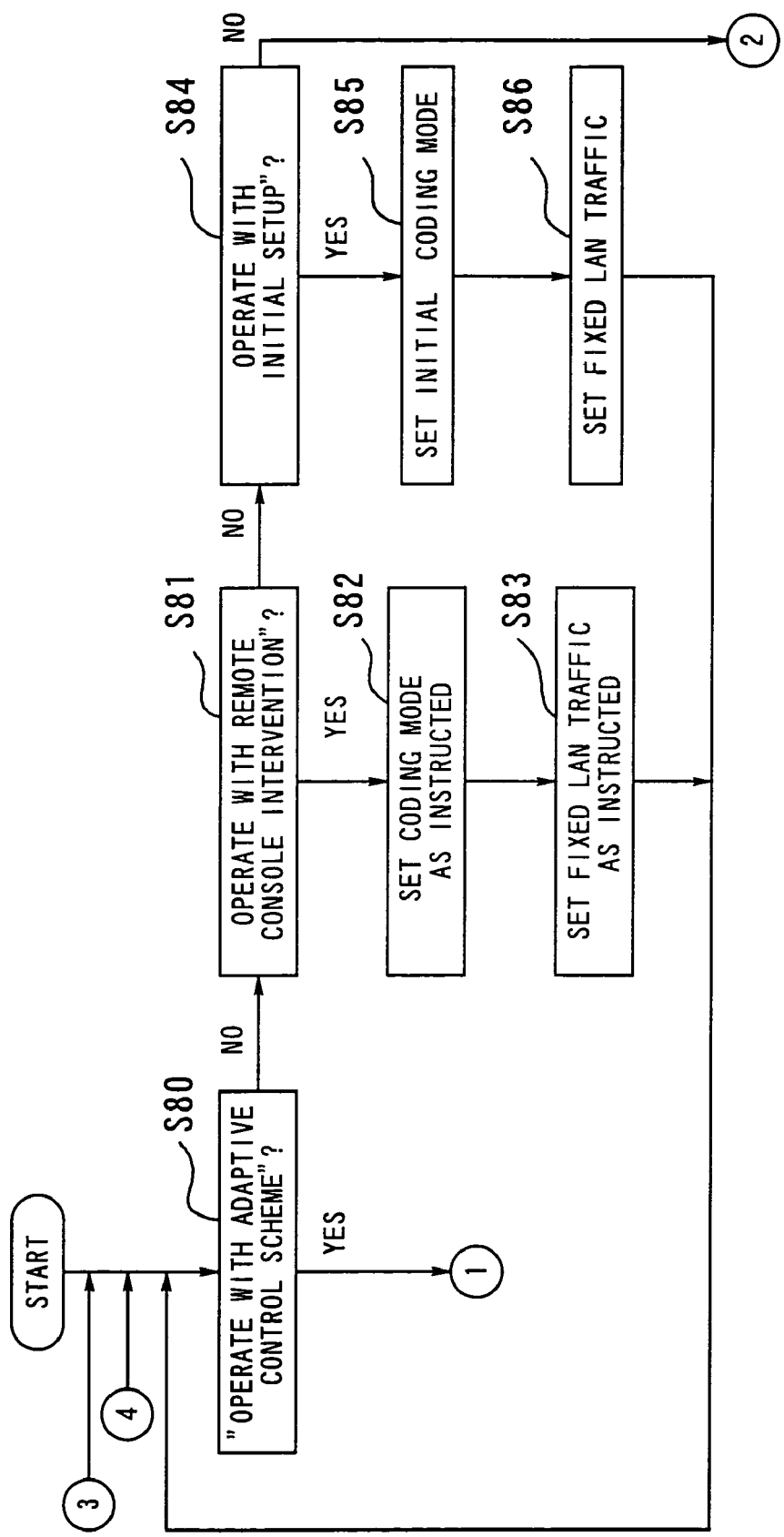
FIGS. 18 to 20 show a flowchart of a process to determine video data traffic and coding mode, based on external events.
Figure 19:
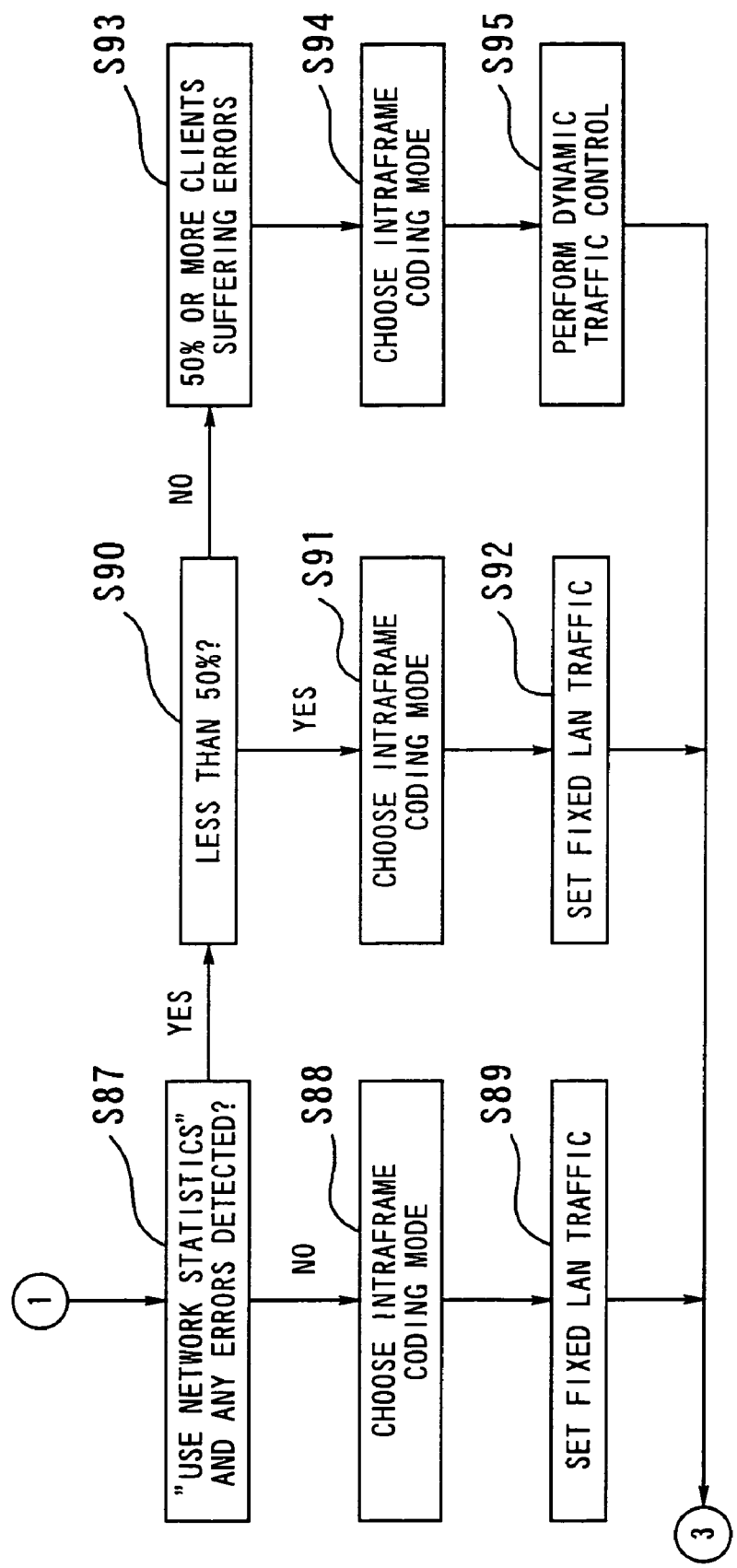
Figure 20:
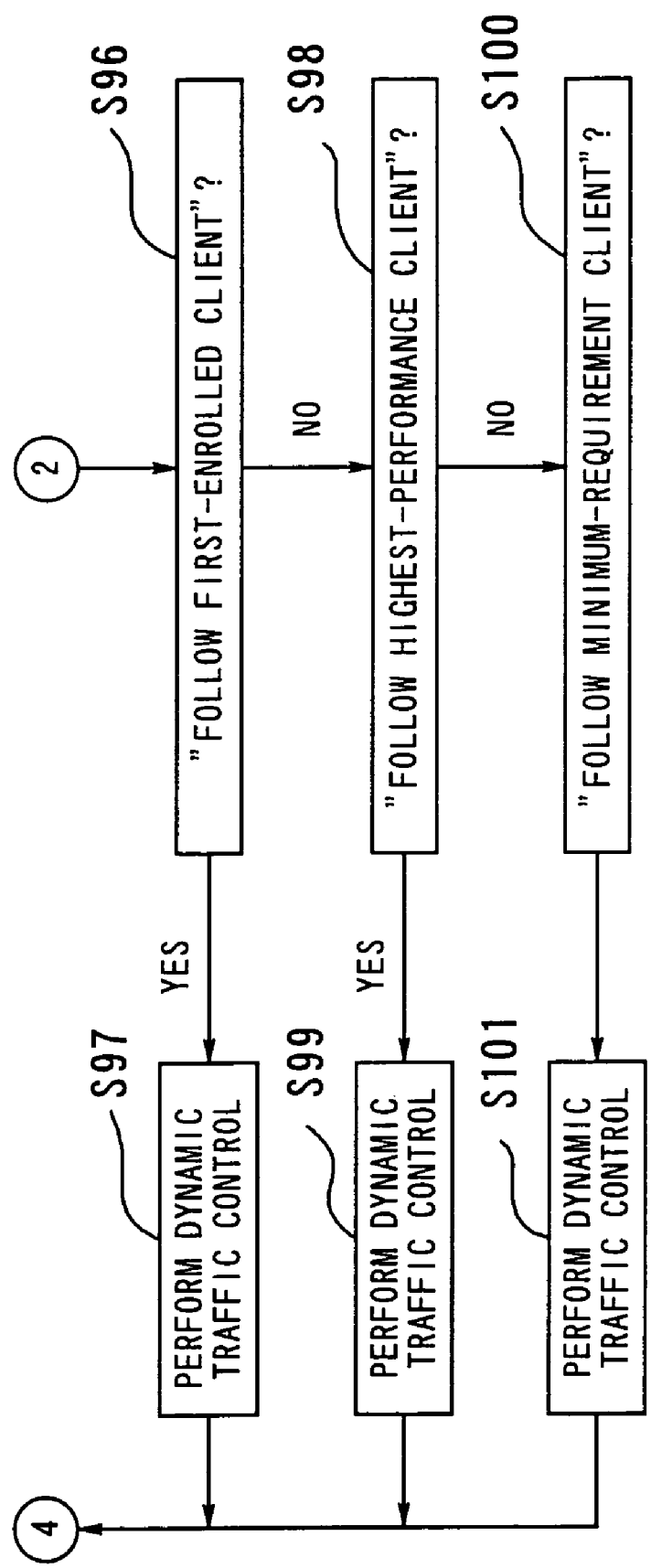

Referring now to a flowchart of FIGS. 18 to 20, the following section will describe how the video data traffic and coding mode are determined on the basis of various events notified. This process comprises the following steps.

(S80) If there is a supervisor event E1 "Operate with adaptive control scheme," then the process proceeds to step S87. Otherwise, the process advances to step S81.
(S81) If there is a supervisor event E1 "Operate with remote console intervention," then the process proceeds to step S82. Otherwise, the process advances to step S84.
(S82) The video data distribution unit 10 determines whether to use intraframe coding mode or interframe coding mode, according to an instruction from the remote console.
(S83) The video data distribution unit 10 sets the video data traffic, according to a fixed LAN traffic specified by the remote console. The process then returns to step S80.
(S84) If there is a supervisor event E1 "Operate with initial setup," then the process proceeds to step S85. Otherwise, the process advances to step S96.
(S85) The video data distribution unit 10 loads an initial parameter value to determine whether to use intraframe coding mode or interframe coding mode.
(S86) The video data distribution unit 10 loads an initial parameter value that gives a fixed LAN traffic. The process then returns to step S80.
(S87) If there is a network event E2 "Use network statistics," and if it indicates no errors, the process advances to step S88. If it indicates the presence of errors, the process proceeds to step S90.
(S88) The video data distribution unit 10 chooses interframe coding mode.
(S89) The video data distribution unit 10 sets a fixed LAN traffic.
(S90) Examining the reported error statistics, the video data distribution unit 10 determines how many client PCs are suffering errors. If it is less than 50 percents, the process advances to step S91. If it is 50 percents or more, the process advances to step S93.
(S91) The video data distribution unit 10 chooses interframe coding mode.
(S92) The video data distribution unit 10 sets a fixed LAN traffic.
(S93) Now that 50 percents or more client PCs are suffering errors, the process advances to step S94.
(S94) The video data distribution unit 10 chooses intraframe coding mode.
(S95) The video data distribution unit 10 enters dynamic traffic control mode. The details will be provided later in FIG. 21.
(S96) If there is a client event E3 "Follow first-enrolled client PC," the process advances to step S97. Otherwise, the process proceeds to step S98.
(S97) The video data distribution unit 10 enters dynamic traffic control mode. The details will be provided later in FIG. 22.
(S98) If there is a client event E3 "Follow highest-performance client PC," the process advances to step S99. Otherwise, the process proceeds to step S100.
(S99) The video data distribution unit 10 enters dynamic traffic control mode. The details will be provided later in FIG. 23.
(S100) Now that the client event E3 "Follow minimum-requirement client PC" is considered to be active, the process advances to step S101.
(S101) The video data distribution unit 10 enters dynamic traffic control mode. The details will be provided later in FIG. 24.

Figure 21:
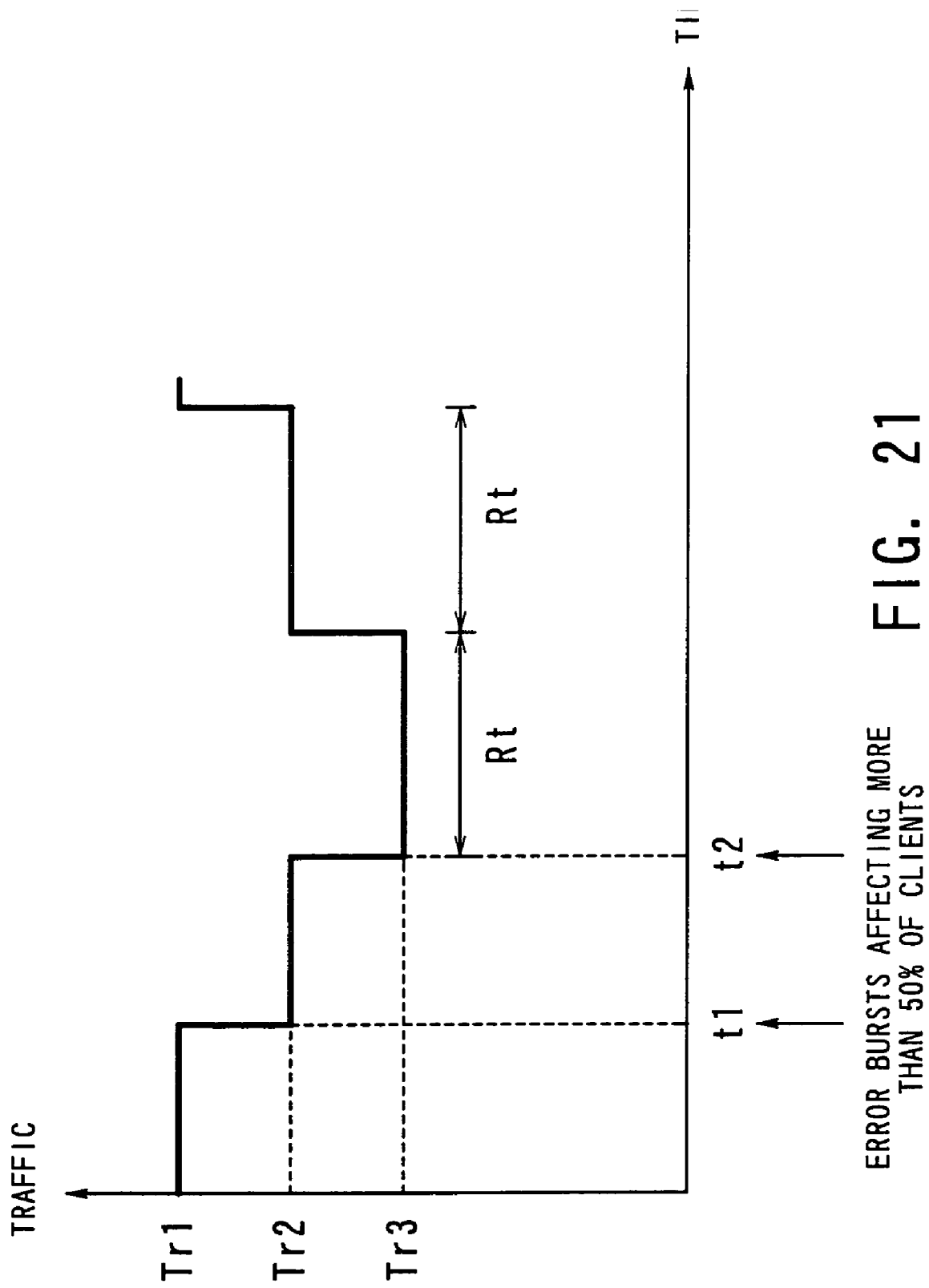
FIG. 21 is a diagram which shows how the dynamic traffic controller deals with error events.

Referring next to FIG. 21, the dynamic traffic control of step S95 will be described below by way of example. FIG. 21 illustrates how the dynamic traffic controller 12 responds to detected errors, in which the vertical axis shows the traffic level and the horizontal axis the time. The video data distribution unit 10 starts with the initial traffic level Tr1. At time t1, it experiences a burst of errors which strike more than 50 percents of client PCs. In response to this burst, the dynamic traffic controller 12 reduces the traffic level to the second level Tr2. At time t2, the video data distribution unit 10 is informed of another error burst from more than 50 percents of client PCs, and accordingly, the dynamic traffic controller 12 further reduces the traffic level from Tr2 to Tr3.

Meanwhile, the dynamic traffic controller 12 has a recovery timer to determine whether to restore the former traffic level. This recovery timer, having a time constant Rt, is triggered at time t2, and its first expiration at time (t2+Rt) allows the dynamic traffic controller 12 to raise the traffic level from Tr3 to Tr2. In a similar manner, the second expiration of the recovery timer brings the traffic level back to the initial level Tr1 at time (t2+2Rt).

Figure 22:
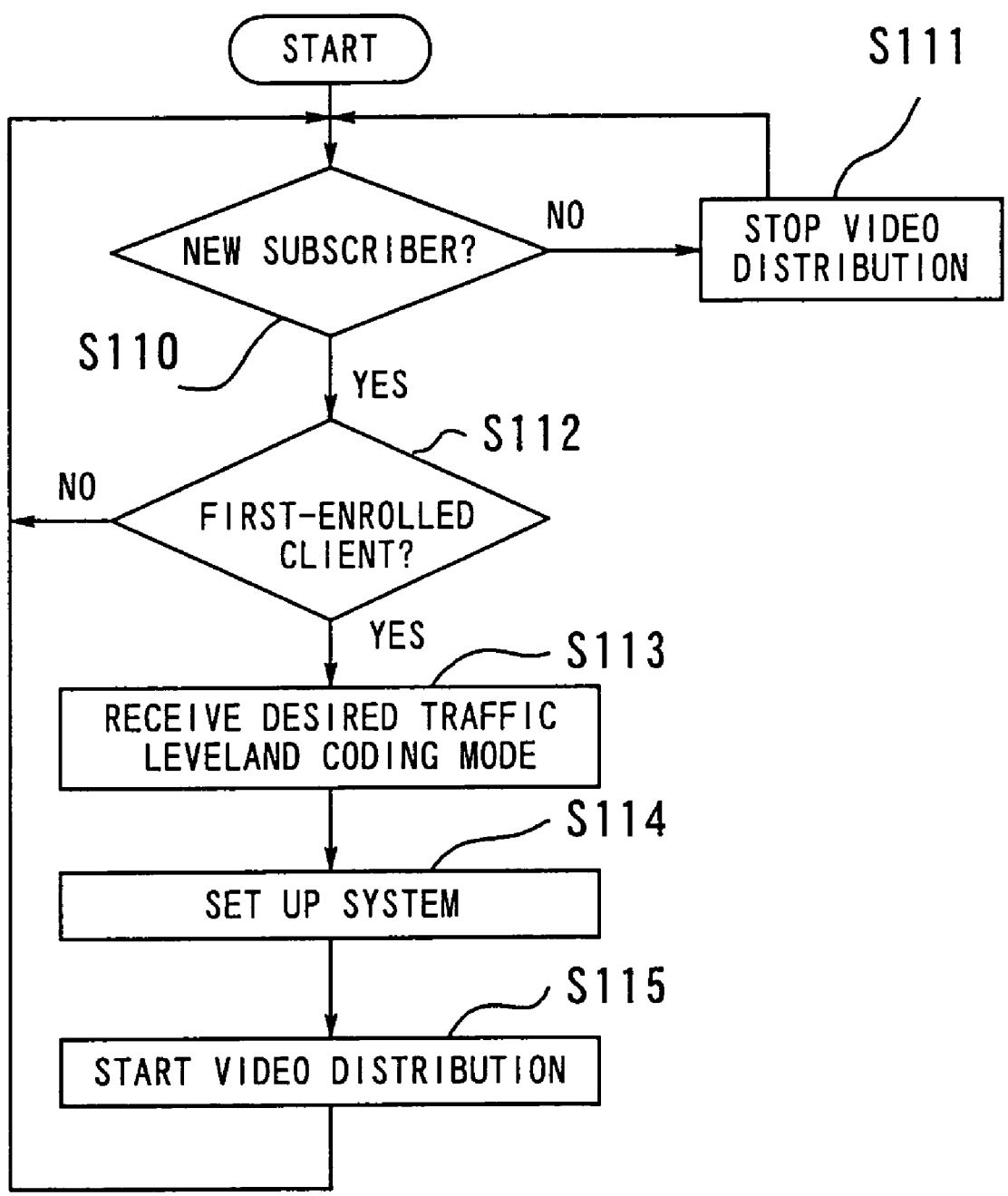
FIG. 22 is a diagram which shows how the dynamic traffic controller operates when it is directed to follow the first-enrolled client PC.

Referring next to FIG. 22, the details of the dynamic traffic control called at step S97 (FIG. 20) will be described below. FIG. 22 is a flowchart of a traffic control process when the dynamic traffic controller 12 is directed to follow the first-enrolled client PC. This process comprises the following steps.

(S110) If there is any client who wishes to subscribe to video information services (i.e., delivery of video data Di), the video data distribution unit 10 accepts the enrollment of this client and advances to step S112. If no such clients are found, the process proceeds to step S111.

(S111) Since there are no subscribers, the video data distribution unit 10 stops sending video data Di and returns to step S110.

(S112) If the newly enrolled client is the very first client, then the process advances to step S113. Otherwise, the process returns to step S110.

(S113) From the first-enrolled client, the video data distribution unit 10 receives its desired traffic level and coding mode.

(S114) The dynamic traffic controller 12 consults appropriate tables, such as the table Ta of FIG. 15, to set up the system according to the requirements received at step S113 from the first-enrolled client.

(S115) Based on the setup made at step S114, the distribution unit 13 begins to distribute video data Di. The process then returns to step S110.

Figure 23:
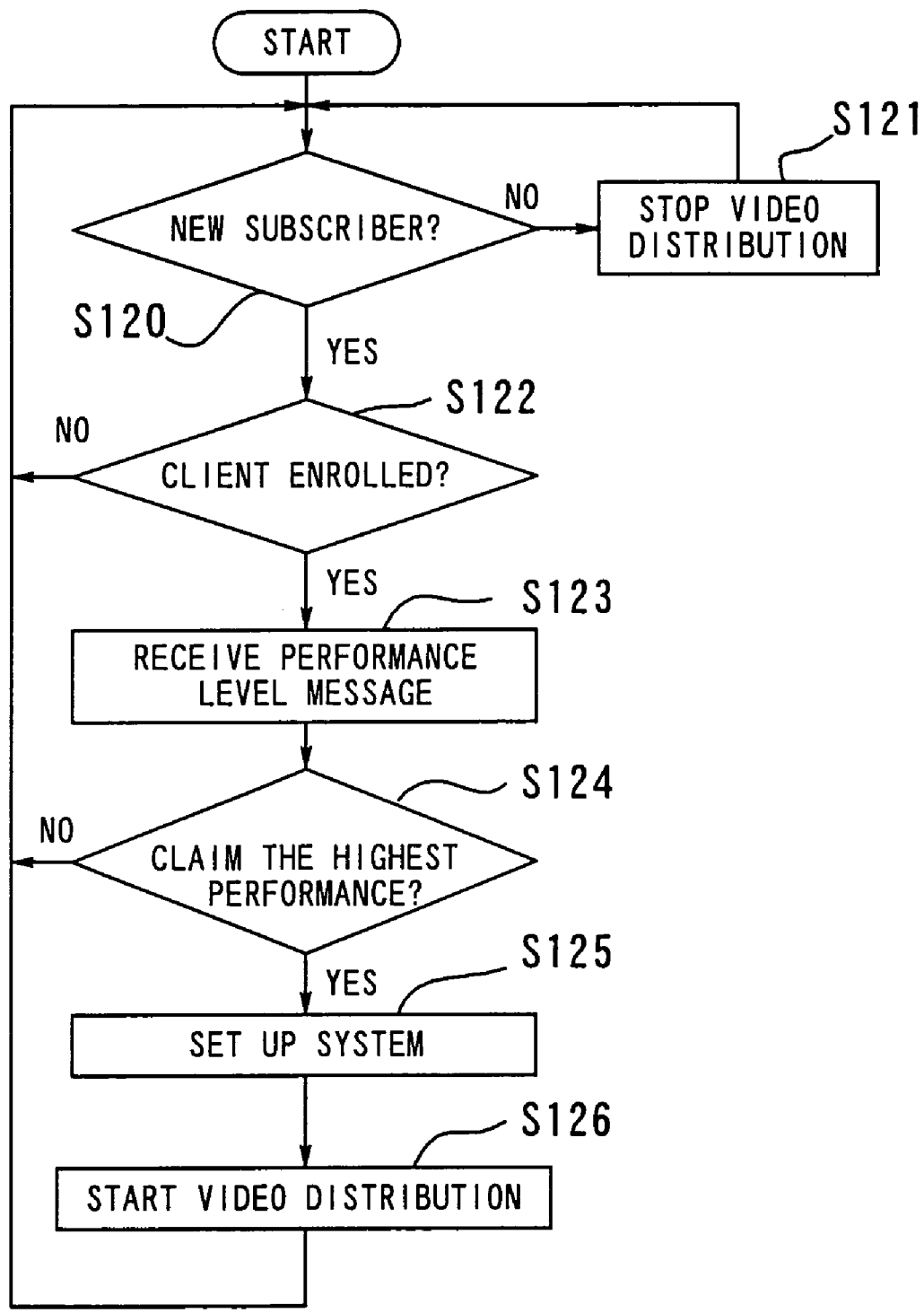
FIG. 23 is a diagram which shows how the dynamic traffic controller operates when it is directed to follow the highest-performance client PC.

Referring next to FIG. 23, the details of the dynamic traffic control called at step S99 (FIG. 20) will be described below. FIG. 23 is a flowchart of a traffic control process when the dynamic traffic controller 12 is directed to follow the highest-performance client PC. This process comprises the following steps.

(S120) If there is any client who wishes to subscribe to video information services, the process advances to step S122. If no such clients are found, the process proceeds to step S121.

(S121) Since there are no subscribers, the video data distribution unit 10 stops sending video data Di and then returns to step S120.

(S122) If a new client PC is enrolled, the process advances to step S123. Otherwise, the process returns to step S120.

(S123) The dynamic traffic controller 12 receives a performance level message from the client PC.

(S124) If it is revealed that the client PC has the highest performance among others, the process advances to step S125. Otherwise, the process returns to step S120.

(S125) The dynamic traffic controller 12 consults appropriate tables, such as the table Tb of FIG. 16, to set up the system according to the information received at step S123 from the client.

(S126) Based on the setup made at step S125, the distribution unit 13 begins to distribute video data Di. The process then returns to step S120.

Figure 24:
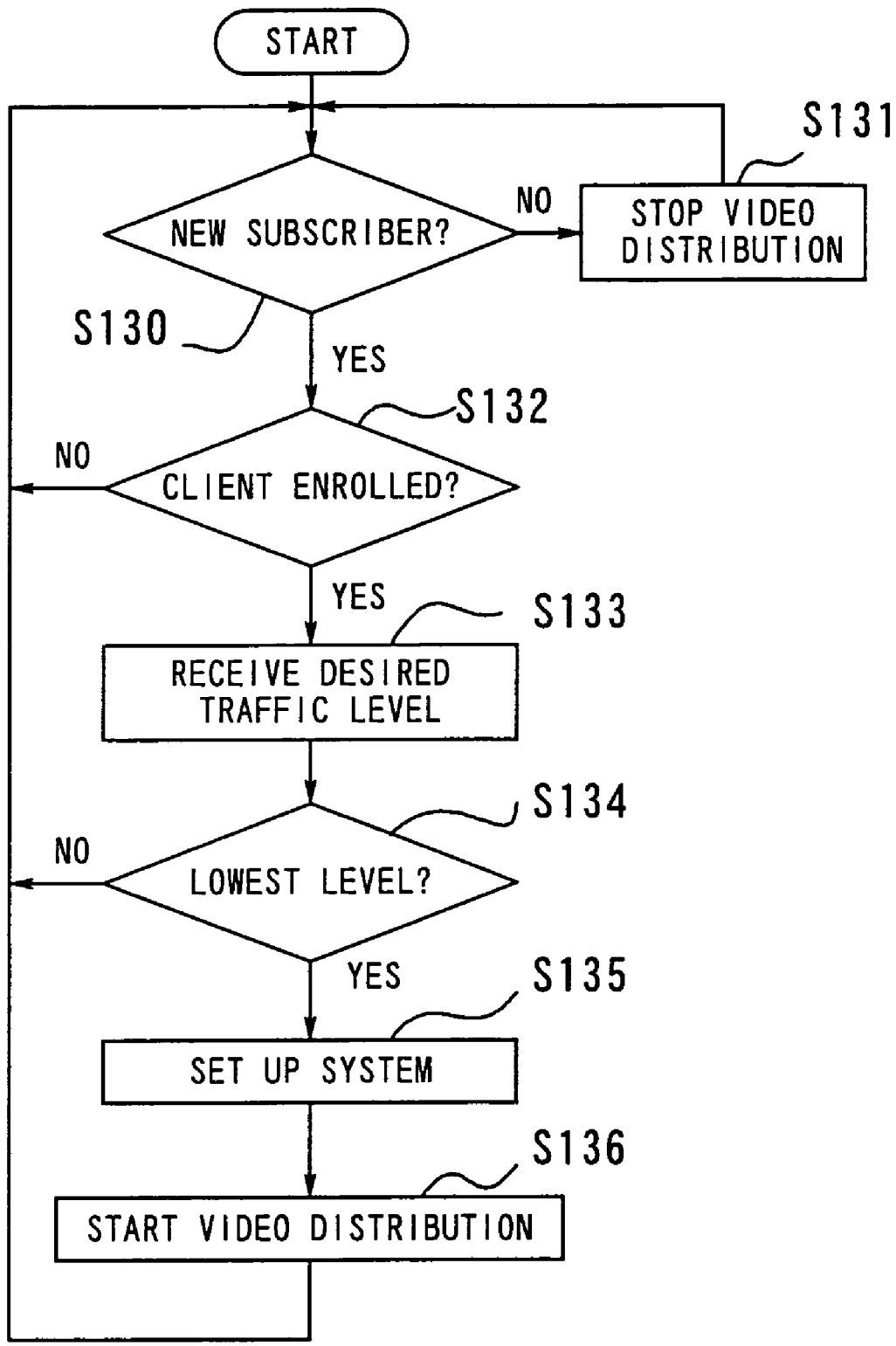
FIG. 24 is a diagram which shows how the dynamic traffic controller operates when it is directed to follow the minimum-requirement client PC.

Referring next to FIG. 24, the details of the dynamic traffic control called at step S101 (FIG. 20) will be described below. FIG. 24 is a flowchart of a traffic control process when the dynamic traffic controller 12 is directed to follow the client with a minimum traffic requirement. This process comprises the following steps.

(S130) If there is any client who wishes to subscribe to video information services, the process advances to step S132. If no such clients are found, the process proceeds to step S131.

(S131) Since there are no subscribers, the video data distribution unit 10 stops sending video data Di. The process then returns to step S120.

(S132) If a new client PC is enrolled, the process advances to step S133. Otherwise, the process returns to step S130.

(S133) The dynamic traffic controller 12 receives a desired traffic level from the client PC.

(S134) If the client PC specifies the lowest traffic level among others, the process advances to step S135. Otherwise, the process returns to step S130.

(S135) The dynamic traffic controller 12 consults appropriate tables, such as the table Tb of FIG. 16, to set up the system according to the information received at step S133 from the client.

(S136) Based on the setup made at step S135, the distribution unit 13 begins to distribute video data Di. The process then returns to step S130.

Figure 25:
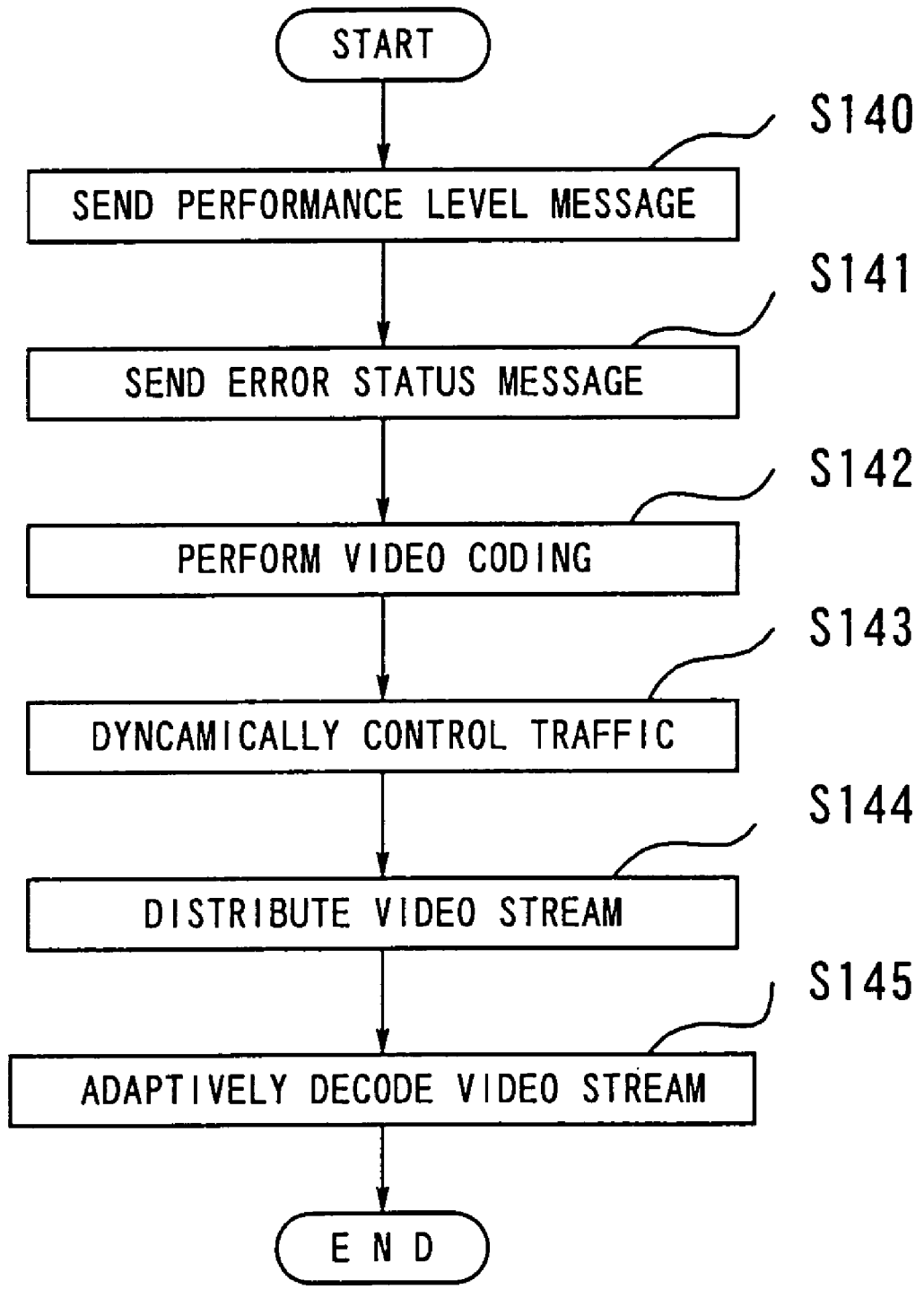
FIG. 25 is a flowchart which shows a video distribution method according to the present invention.

Referring next to a flowchart of FIG. 25, a video distribution method of the present invention will be described below. The proposed method comprises the following steps.

(S140) A performance level message is sent from each data terminal, which indicates the performance of the sending data terminal itself.

(S141) An error status message is sent from each data terminal when the sending data terminal encounters an error.

(S142) Coded data is produced by coding given source video signals, based on the information contained in the performance level message and the error status message.

Preferably, the coding of video data at this step S142 is performed in either of two operation modes. One is interframe coding mode, in which differences between video frames are detected and encoded. The other is intraframe coding mode, in which an intra-coded frame is periodically inserted into an interframe coded video stream.

If the received performance level messages indicate that there is a member data terminal with insufficient performance, the coding will be performed preferably in intraframe coding mode.

Also, when the error status messages indicate intolerably frequent errors, the coding will be performed preferably in intraframe coding mode.

(S143) Video data traffic is dynamically controlled.

(S144) The resultant video stream is distributed to data terminals over a network.

(S145) The delivered video stream is adaptively decoded at each data terminal. Preferably, data terminals with insufficient performance selectively decode intra-coded frames, thereby reproducing a subsampled video stream. In the same way, data terminals that have experienced errors also reproduce a subsampled video stream from the delivered video stream.

The above discussion will now be summarized as follows. According to the present invention, the proposed system and method are designed to perform video coding based on performance level messages Da and error status messages received from data terminals. The output video stream is distributed through a dynamically assigned video traffic channel. The receiving data terminals reproduce video pictures by decoding the delivered video stream adaptively to their own performance levels and error status. This permits the video data distribution unit to deliver video information in a more flexible manner, taking into consideration the clients' performance levels and error statistics, along with network traffic suitable for the environment.

Although the above description of the preferred embodiment have been focused on the distribution of video information, it is not intended to limit the invention to this particular data type. Rather, it should be appreciated that the invention can apply to multimedia communications, including distribution of video, voice, data, and any combinations of them.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A system for controlling distribution of video information over a network, comprising:

(a) a video data distribution unit comprising:

coding means for producing coded data by encoding source video signals based on performance level messages and error status messages that are received, wherein said coding means inserts an intraframe-coded frame in a sequence of interframed-coded frames at predetermined regular intervals, when the received performance level messages indicate the presence of such a recipient whose performance is insufficient to fully decode the coded data, or when the error status messages indicate the presence of such a recipient that is experiencing intolerably frequent errors, dynamic traffic control means for dynamically controlling traffic of the coded data, thereby producing a video stream for distribution, and video distribution means for distributing the produced video stream over the network; and (b) a plurality of data terminals, each comprising:

performance level notification means for evaluating performance of said each data terminal and sending the performance report message to indicate the performance evaluated, error status monitoring means for monitoring error status of said each data terminal and sending the error status message to said video data distribution unit when an error is detected, and decoding means for adaptively decoding the video stream delivered thereto, wherein said adaptive decoding in a data terminal reproduces a subsampled video stream by selectively decoding a portion of the intra-coded frames out of the delivered video stream, when said performance level notification means identifies that the performance is insufficient to fully decode the delivered video stream including interframe-coded frames, or when said error status monitoring means detects intolerably frequent errors.

2. The system according to claim 1, wherein said dynamic traffic control means determines a rate multiplier according to the perforce level messages and error status messages, and dynamically varies the effective transfer rate of the coded data by applying the rate multiplier thereto.

3. The system according to claim 2, wherein said dynamic traffic control means determines the rate multiplier from at least one of:

supervisor events representing requests from a supervisor;

network events representing network status; and client events representing status and requests from the data terminals.

4. The system according to claim 1, wherein said dynamic traffic control means separately controls the traffic for each distribution path.

5. The system according to claim 1, wherein said dynamic traffic control means has a timer with a predetermined interval, and varies the traffic in a stepwise manner, each time the predetermined interval expires.

6. The system according to claim 1, wherein said performance level reporting means sends the performance level message containing information about resources that said each data terminal owns or benchmark scores that said each data terminal achieved.

7. The system according to claim 1, further comprising program data sending means for providing information on what video programs are distributed.

8. A video data distribution unit which distributes video information to a plurality of data terminals over a network, comprising:

coding means for producing coded data by encoding source video signals, based on performance level messages and error status messages received from the data terminals, wherein said coding means inserts an intraframe-coded frame in a sequence of interframe-coded frames at predetermined regular intervals, when the received performance level messages indicate the presence of such a data terminal whose performance is insufficient to fully decode the coded data, or when the error status messages indicate the presence of such a data terminal that is experiencing intolerably frequent errors, dynamic traffic control means for dynamically controlling traffic of the coded data, thereby producing a video stream for distribution; and video distribution means for distributing the produced video stream over the network, wherein said data terminal adaptively decoding the delivered video stream by reproducing a subsampled video stream by selectively decoding a portion of the intra-coded frames out of the delivered video stream, when the performance is insufficient to fully decode the delivered video stream including interframe-coded frames, or when frequent errors are detected.

9. A data terminal which replays video information delivered over a network, comprising:

performance level notification means for evaluating performance of the data terminal and sending a performance report message to indicate the performance evaluated;

error status monitoring means for monitoring error status of the data terminal and sending an error status message; and decoding means for adaptively decoding a video stream delivered thereto, wherein said adaptive decoding in the data terminal reproduces a subsampled video stream by selectively decoding a portion of intra-coded frames out of the delivered video stream, when said performance level notification means identifies that the performance is insufficient to fully decode the delivered video stream including interframe-coded frames, or when said error status monitoring means detects intolerably frequent errors.

10. A method of controlling distribution of video information to a plurality of data terminals over a network, comprising the steps of:

(a) sending a performance level message from each data terminal to indicate performance of the sending data terminal itself;

(b) sending an error status message from each data terminal when the sending data terminal encounters an error;

(c) producing coded data by encoding source video signals, based on information contained in the performance level messages and error status messages received from the data terminals, wherein said encoding inserts an intraframe-coded frame in a sequence of interframe-coded frames at predetermined regular intervals, when the performance level message indicates the presence of such a recipient whose performance is insufficient to fully decode the coded data, or when the error status message indicates the presence of such a recipient that is experiencing intolerably frequent errors;

(d) producing a video stream by dynamically controlling traffic of the coded data;

(e) distributing the produced video stream to the data terminals over the network; and (f) adaptively decoding the received video stream at each data terminal, wherein said adaptive decoding reproduces a subsampled video stream by selectively decoding a portion of the intra-coded frames out of the delivered video stream, when said each data terminal identifies that the performance is insufficient to fully decode the received video stream including interframe-coded frames, or when said each data terminal detects intolerably frequent errors.

11. The method according to claim 10, wherein:

said step (c) of producing the coded data is performed either in interframe coding mode or in intraframe coding mode;

when the interframe coding mode is chosen, said step (c) encodes differences between frames; and when the intraframe coding mode is chosen, said step (c) inserts an intra-coded frame into a series of interframe coded frames at regular intervals.

* * * * *